United States Patent
Ridder

(10) Patent No.: US 10,605,477 B2
(45) Date of Patent: Mar. 31, 2020

(54) HVAC SYSTEM WITH FREE COOLING OPTIMIZATION BASED ON COOLANT FLOWRATE

(71) Applicant: Johnson Controls Technology Company, Plymouth, MI (US)

(72) Inventor: Bradley J. Ridder, Milwaukee, WI (US)

(73) Assignee: Johnson Controls Technology Company, Auburn Hills, MI (US)

(*) Notice: Subject to any disclaimer, the term of this patent is extended or adjusted under 35 U.S.C. 154(b) by 416 days.

(21) Appl. No.: 15/422,422

(22) Filed: Feb. 1, 2017

(65) Prior Publication Data

US 2018/0209675 A1    Jul. 26, 2018

Related U.S. Application Data

(63) Continuation-in-part of application No. 15/411,878, filed on Jan. 20, 2017, now Pat. No. 9,982,903.

(51) Int. Cl.
*F24F 11/00* (2018.01)
*F24F 11/83* (2018.01)
(Continued)

(52) U.S. Cl.
CPC ........... *F24F 11/83* (2018.01); *F24F 3/001* (2013.01); *F24F 5/001* (2013.01); *F24F 5/0003* (2013.01);
(Continued)

(58) Field of Classification Search
None
See application file for complete search history.

(56) References Cited

U.S. PATENT DOCUMENTS 5,040,377 A * 8/1991 Braun .................. F25B 49/027
165/299
5,600,960 A * 2/1997 Schwedler ............ F25B 49/027
62/185
(Continued)

FOREIGN PATENT DOCUMENTS

CN        205897444 U     1/2017
EP        3 088 972 A2    11/2016

OTHER PUBLICATIONS

U.S. Appl. No. 15/232,800, filed Aug. 9, 2016, Johnson Controls Technology Company.
(Continued)

*Primary Examiner* — Bernard G Lindsay
(74) *Attorney, Agent, or Firm* — Foley & Lardner LLP

(57) ABSTRACT

An HVAC system for a building includes a heat exchanger configured to transfer heat from a chilled fluid circuit to a cooling tower circuit to provide cooling for a chilled fluid in the chilled fluid circuit, a cooling tower configured to remove heat from the cooling tower circuit to provide cooling for a coolant in the cooling tower circuit, one or more pumps configured to circulate the coolant between the cooling tower and the heat exchanger via the cooling tower circuit, and a free cooling controller. The controller is configured to determine an optimal flowrate of the coolant in the cooling tower circuit, determine an optimal flowrate of air through the cooling tower, and operate the one or more pumps and the cooling tower to achieve the optimal flowrate of the coolant in the cooling tower circuit and the optimal flowrate of the air through the cooling tower.

20 Claims, 14 Drawing Sheets

(51) Int. Cl.

| | |
|---|---|
| *F24F 11/30* | (2018.01) |
| *F24F 11/46* | (2018.01) |
| *F24F 5/00* | (2006.01) |
| *F24F 11/47* | (2018.01) |
| *F24F 11/84* | (2018.01) |
| *F24F 11/65* | (2018.01) |
| *F24F 3/00* | (2006.01) |
| *F24F 11/62* | (2018.01) |
| *G05D 23/19* | (2006.01) |
| *F24F 140/60* | (2018.01) |
| *F24F 110/12* | (2018.01) |
| *F24F 130/10* | (2018.01) |
| *F24F 11/85* | (2018.01) |

(52) U.S. Cl.
CPC ............ *F24F 5/0035* (2013.01); *F24F 11/30* (2018.01); *F24F 11/46* (2018.01); *F24F 11/47* (2018.01); *F24F 11/62* (2018.01); *F24F 11/65* (2018.01); *F24F 11/84* (2018.01); *G05D 23/1919* (2013.01); *F24F 11/85* (2018.01); *F24F 2110/12* (2018.01); *F24F 2130/10* (2018.01); *F24F 2140/60* (2018.01); *Y02B 30/542* (2013.01)

(56) References Cited

U.S. PATENT DOCUMENTS

| | | | |
|---|---|---|---|
| 5,963,458 A * | 10/1999 | Cascia | F25B 49/02 165/200 |
| 6,219,590 B1 | 4/2001 | Bernaden, III et al. | |
| 7,827,813 B2 | 11/2010 | Seem | |
| 8,027,742 B2 | 9/2011 | Seem et al. | |
| 8,096,140 B2 | 1/2012 | Seem | |
| 8,200,344 B2 | 6/2012 | Li et al. | |
| 8,200,345 B2 | 6/2012 | Li et al. | |
| 8,495,888 B2 | 7/2013 | Seem | |
| 8,903,554 B2 | 12/2014 | Stagner | |
| 9,982,903 B1 | 5/2018 | Ridder et al. | |
| 2003/0155429 A1 | 8/2003 | Sparling et al. | |
| 2005/0278070 A1* | 12/2005 | Bash | H05K 7/20836 700/276 |
| 2010/0023167 A1* | 1/2010 | Ito | F24F 11/30 700/275 |
| 2010/0307171 A1* | 12/2010 | Hamann | F25B 25/00 62/77 |
| 2011/0057803 A1 | 3/2011 | Yamaoka et al. | |
| 2012/0042672 A1 | 2/2012 | Fujihara et al. | |
| 2013/0264046 A1* | 10/2013 | Chainer | G06F 1/206 165/287 |
| 2014/0008043 A1 | 1/2014 | Canney et al. | |
| 2014/0148968 A1 | 5/2014 | Chapman et al. | |
| 2014/0350738 A1 | 11/2014 | Angerame et al. | |
| 2016/0132027 A1 | 5/2016 | Li et al. | |
| 2016/0209852 A1 | 7/2016 | Beyhaghi et al. | |
| 2016/0223214 A1 | 8/2016 | Turner et al. | |
| 2017/0130996 A1* | 5/2017 | Hatanaka | F24F 11/89 |
| 2017/0198933 A1 | 7/2017 | Erpelding et al. | |
| 2018/0046164 A1 | 2/2018 | Drees | |

OTHER PUBLICATIONS

Office Action on U.S. Appl. No. 15/925,466 dated Aug. 15, 2018. 10 pages.
Office Action on European Patent Application No. 18152053.7 dated May 17, 2018. 5 pages.
Braun, Load Control Using Building Thermal Mass, Aug. 2003, 10 pages.
Office Action for U.S. Appl. No. 15/411,878, dated Aug. 25, 2017, 37 pages.
Arthur J Helmicki, Clas A Jacobson, and Carl N. Nett. Control Oriented System Identification: a Worstcase/deterministic Approach in H1. IEEE Transactions on Automatic control, 36(10):1163-1176, 1991. 13 pages.
Diederik Kingma and Jimmy Ba. Adam: A Method for Stochastic Optimization. In International Conference on Learning Representations (ICLR), 2015, 15 pages.
George EP Box, Gwilym M Jenkins, Gregory C Reinsel, and Greta M Ljung. Time Series Analysis: Forecasting and Control. John Wiley & Sons, 2015, chapters 13-15. 82 pages.
Jie Chen and Guoxiang Gu. Control-oriented System Identification: an H1 Approach, vol. 19. Wiley-Interscience, 2000, chapters 3 & 8, 38 pages.
Jingjuan Dove Feng, Frank Chuang, Francesco Borrelli, and Fred Bauman. Model Predictive Control of Radiant Slab Systems with Evaporative Cooling Sources. Energy and Buildings, 87:199-210, 2015. 11 pages.
K. J. Astrom. Optimal Control of Markov Decision Processes with Incomplete State Estimation. J. Math. Anal. Appl., 10:174-205, 1965.31 pages.
Kelman and F. Borrelli. Bilinear Model Predictive Control of a HVAC System Using Sequential Quadratic Programming. In Proceedings of the 2011 IFAC World Congress, 2011, 6 pages.
Lennart Ljung and Torsten Soderstrom. Theory and practice of recursive identification, vol. 5. JSTOR, 1983, chapters 2, 3 & 7, 80 pages.
Lennart Ljung, editor. System Identification: Theory for the User (2nd Edition). Prentice Hall, Upper Saddle River, New Jersey, 1999, chapters 5 and 7, 40 pages.
Moritz Hardt, Tengyu Ma, and Benjamin Recht. Gradient Descent Learns Linear Dynamical Systems. arXiv preprint arXiv:1609. 05191, 2016, 44 pages.
Nevena et al. Data center cooling using model-predictive control, 10 pages.
Sergio Bittanti, Marco C Campi, et al. Adaptive Control of Linear Time Invariant Systems: The "Bet on the Best" Principle. Communications in Information & Systems, 6(4):299-320, 2006. 21 pages.
Yudong Ma, Anthony Kelman, Allan Daly, and Francesco Borrelli. Predictive Control for Energy Efficient Buildings with Thermal Storage: Modeling, Stimulation, and Experiments. IEEE Control Systems, 32(1):44-64, 2012. 20 pages.
Yudong Ma, Francesco Borrelli, Brandon Hencey, Brian Coffey, Sorin Bengea, and Philip Haves. Model Predictive Control for the Operation of Building Cooling Systems. IEEE Transactions on Control Systems Technology, 20(3):796-803, 2012.7 pages.

\* cited by examiner

HVAC SYSTEM WITH FREE COOLING OPTIMIZATION BASED ON COOLANT FLOWRATE

CROSS-REFERENCE TO RELATED PATENT APPLICATION

This application is a continuation-in-part of U.S. patent application Ser. No. 15/411,878 filed Jan. 20, 2017, the entire disclosure of which is incorporated by reference herein.

BACKGROUND

The present disclosure relates generally to heating, ventilation, or air conditioning (HVAC) systems for a building. The present disclosure relates more particularly to a HVAC system configured to optimize the operation of HVAC equipment used to provide free cooling to a building.

Free cooling is a technology which uses low temperature outside air to provide cooling for a system without requiring the use of chillers. Free cooling can be used as an alternative to mechanical cooling (e.g., vapor compression cooling) under certain favorable weather conditions. For example, chillers are typically used to provide mechanical cooling for a building (e.g., by chilling a fluid provided to the building) when the outside air temperature is above a threshold temperature required for free cooling. When the outside air temperature drops below the threshold, the chillers providing mechanical cooling can be deactivated and cooling towers can be used instead to provide free cooling.

SUMMARY

One implementation of the present disclosure is a heating, ventilation, or air conditioning (HVAC) system for a building. The HVAC system includes a heat exchanger configured to transfer heat from a chilled fluid circuit to a cooling tower circuit to provide cooling for a chilled fluid in the chilled fluid circuit, a cooling tower configured to remove heat from the cooling tower circuit to provide cooling for a coolant in the cooling tower circuit, one or more pumps configured to circulate the coolant between the cooling tower and the heat exchanger via the cooling tower circuit, and a free cooling controller. The controller is configured to determine an optimal flowrate of the coolant in the cooling tower circuit, determine an optimal flowrate of air through the cooling tower, and operate the one or more pumps and the cooling tower to achieve the optimal flowrate of the coolant in the cooling tower circuit and the optimal flowrate of the air through the cooling tower.

In some embodiments, the heat exchanger is configured to transfer the heat from the chilled fluid circuit to the cooling tower circuit at a heat transfer rate dependent upon the flowrate of the coolant in the cooling tower circuit. In some embodiments, the free cooling controller is configured to determine the optimal flowrate of the coolant in the cooling tower circuit by minimizing a difference between the heat transfer rate in the heat exchanger and a cooling load setpoint.

In some embodiments, the cooling tower is configured to remove the heat from the cooling tower circuit at a heat transfer rate dependent upon the flowrate of the air through the cooling tower. In some embodiments, the free cooling controller is configured to determine the optimal flowrate of the air through the cooling tower by minimizing a difference between the heat transfer rate in the cooling tower and a rate of heat transfer in the heat exchanger.

In some embodiments, the free cooling controller is configured to estimate a power consumption of the one or more pumps required to achieve the optimal flowrate of the coolant in the cooling tower circuit, estimate a power consumption of the cooling tower required to achieve the optimal flowrate of air through the cooling tower, and estimate a total power consumption based on the power consumption of the one or more pumps and the power consumption of the cooling tower.

In some embodiments, the HVAC system includes a high level optimizer configured to provide a cooling load setpoint to the free cooling controller. The free cooling controller can be configured to estimate a minimum power consumption required to achieve the cooling load setpoint based on the optimal flowrate of the coolant in the cooling tower circuit and the optimal flowrate of air through the cooling tower and provide the estimated minimum power consumption to the high level optimizer.

In some embodiments, the free cooling controller is configured to determine the optimal flowrate of the coolant in the cooling tower circuit using an iterative numerical technique including at least one of successive substitution, a Newton-Raphson method, and a secant method.

In some embodiments, the free cooling controller is configured to determine the optimal flowrate of the coolant in the cooling tower circuit by iteratively adjusting the flowrate of the coolant in the cooling tower circuit until a rate of heat transfer in the heat exchanger equals a rate at which the chilled fluid circuit absorbs heat from the building.

In some embodiments, the free cooling controller is configured to determine the optimal flowrate of the air through the cooling tower by iteratively adjusting the flowrate of the air through the cooling tower until a rate of heat transfer in the cooling tower equals a rate of heat transfer in the heat exchanger.

In some embodiments, the free cooling controller is configured to determine the optimal flowrate of the coolant in the cooling tower circuit by identifying a first equation that defines an effectiveness of the heat exchanger as a function of the flowrate of the coolant in the cooling tower circuit and identifying a second equation that defines the flowrate of the coolant in the cooling tower circuit as a function of the effectiveness of the heat exchanger. The free cooling controller can recursively substitute values for the flowrate of the coolant in the cooling tower circuit into the first equation, evaluate the first equation to determine resulting values of the effectiveness, and substitute the resulting values of the effectiveness into the second equation until the second equation is balanced.

Another implementation of the present disclosure is a method for providing free cooling to a building. The method includes using one or more pumps to circulate a coolant between a heat exchanger and a cooling tower. The coolant absorbs heat in the heat exchanger and rejects heat in the cooling tower. The method includes determining an optimal flowrate of the coolant in a cooling tower circuit to achieve a cooling load setpoint, determining an optimal flowrate of air through the cooling tower to balance heat transfer in the cooling tower circuit, and operating the one or more pumps and the cooling tower to achieve the optimal flowrate of the coolant in the cooling tower circuit and the optimal flowrate of the air through the cooling tower.

In some embodiments, the coolant absorbs heat in the heat exchanger at a heat transfer rate dependent upon the flowrate of the coolant in the cooling tower circuit. In some embodiments, determining the optimal flowrate of the coolant in the cooling tower circuit includes minimizing a difference between the heat transfer rate in the heat exchanger and a cooling load setpoint.

In some embodiments, the coolant rejects heat in the cooling tower at a heat transfer rate dependent upon the flowrate of the air through the cooling tower. In some embodiments, determining the optimal flowrate of the air through the cooling tower includes minimizing a difference between the heat transfer rate in the cooling tower and a rate of heat transfer in the heat exchanger.

In some embodiments, the method includes estimating a power consumption of the one or more pumps required to achieve the optimal flowrate of the coolant in the cooling tower circuit, estimating a power consumption of the cooling tower required to achieve the optimal flowrate of air through the cooling tower, and estimating a total power consumption based on the power consumption of the one or more pumps and the power consumption of the cooling tower.

In some embodiments, the method includes receiving a cooling load setpoint from a high level optimizer, estimating a minimum power consumption required to achieve the cooling load setpoint based on the optimal flowrate of the coolant in the cooling tower circuit and the optimal flowrate of air through the cooling tower, and providing the estimated minimum power consumption to the high level optimizer.

In some embodiments, determining the optimal flowrate of the coolant in the cooling tower circuit includes using an iterative numerical technique comprising at least one of successive substitution, a Newton-Raphson method, and a secant method.

In some embodiments, determining the optimal flowrate of the coolant in the cooling tower circuit includes iteratively adjusting the flowrate of the coolant in the cooling tower circuit until a rate of heat transfer in the heat exchanger equals a cooling load setpoint for the building.

In some embodiments, determining the optimal flowrate of the air through the cooling tower includes iteratively adjusting the flowrate of the air through the cooling tower until a rate of heat transfer in the cooling tower equals a rate of heat transfer in the heat exchanger.

Another implementation of the present disclosure is a heating, ventilation, or air conditioning (HVAC) system for a building. The HVAC system includes a cooling tower configured to remove heat from a coolant in a cooling tower circuit, one or more pumps configured to circulate the coolant between the cooling tower and a cooling load via the cooling tower circuit, and a free cooling controller. The free cooling controller is configured to determine an optimal flowrate of the coolant in the cooling tower circuit, determine an optimal flowrate of air through the cooling tower, and operate the one or more pumps and the cooling tower to achieve the optimal flowrate of the coolant in the cooling tower circuit and the optimal flowrate of the air through the cooling tower.

In some embodiments, the cooling tower circuit is configured to absorb heat from the cooling load at a rate dependent upon the flowrate of the coolant in the cooling tower circuit. In some embodiments, the free cooling controller is configured to determine the optimal flowrate of the coolant in the cooling tower circuit by minimizing a difference between the rate at which the cooling circuit absorbs heat from the cooling load and a cooling load setpoint.

In some embodiments, the cooling tower is configured to remove the heat from the cooling tower circuit at a heat transfer rate dependent upon the flowrate of the air through the cooling tower. In some embodiments, the free cooling controller is configured to determine the optimal flowrate of the air through the cooling tower by minimizing a difference between the heat transfer rate in the cooling tower and a rate at which the cooling tower circuit absorbs heat from the cooling load.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

Some embodiments will become more fully understood from the following detailed description, taken in conjunction with the accompanying drawings, wherein like reference numerals refer to like elements, in which.

DETAILED DESCRIPTION

Overview

Figure 1:
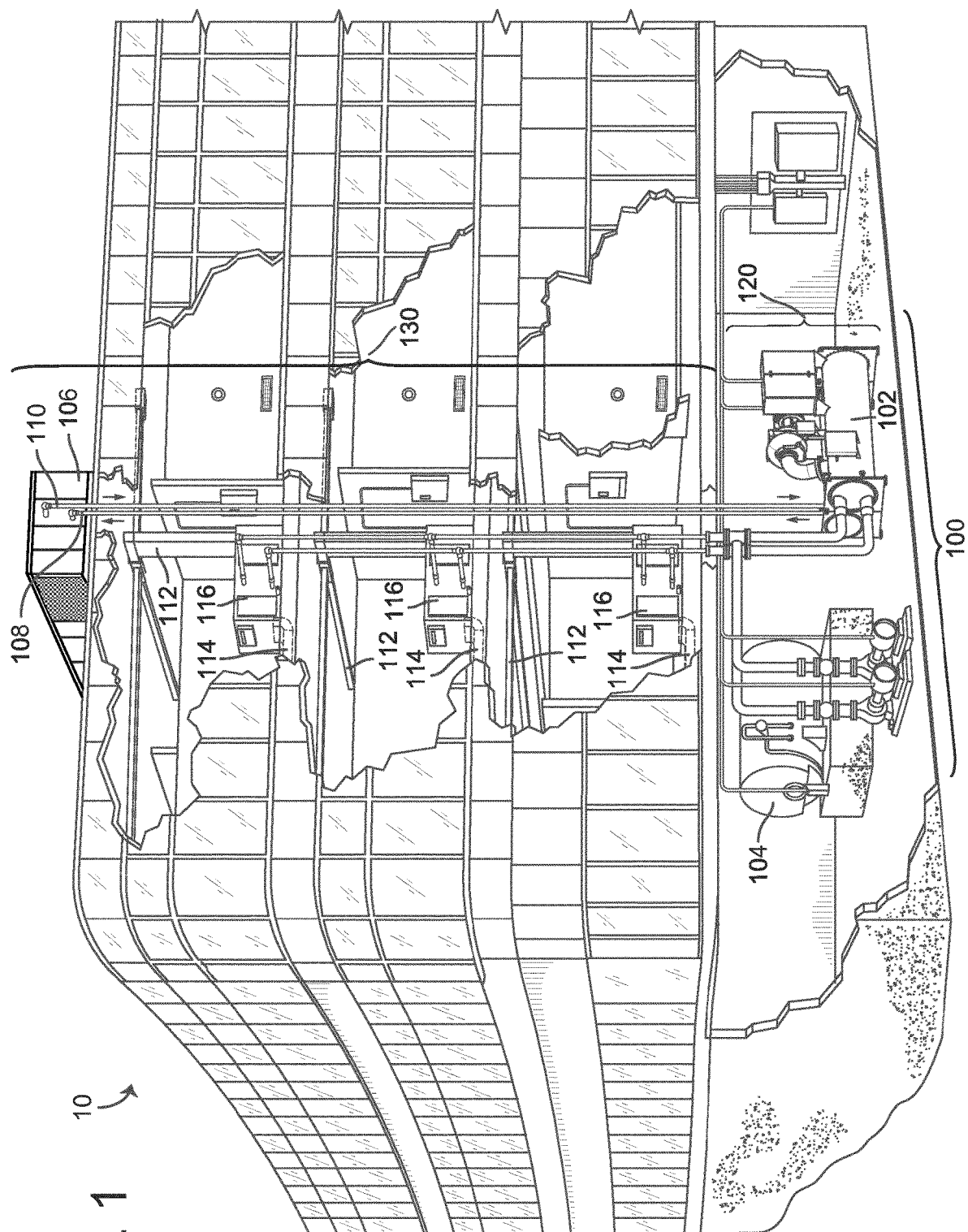
FIG. 1 is a drawing of a building equipped with a heating, ventilation, or air conditioning (HVAC) system, according to an exemplary embodiment.

Referring generally to the FIGURES, a heating, ventilation, or air conditioning (HVAC) system with predictive free cooling control and components thereof are shown, according to various exemplary embodiments. The HVAC system can operate in both a mechanical cooling state and a free cooling state. The HVAC system can transition between the mechanical cooling state and free cooling state to provide economically optimal cooling for a cooling load. In some embodiments, the HVAC system includes a controller which can evaluate state transition conditions and transition between operating states based on a result of the evaluation.

In traditional free cooling systems, free cooling is typically used whenever the outdoor air temperature is below a minimum temperature required for free cooling. However, the traditional approach does not take into account the economic cost associated with transitioning between operating states. For example, switching between a mechanical cooling state and a free cooling state may incur an economic cost. The economic cost may result from increased electricity consumption when a chiller is starting-up, increased equipment degradation resulting from switching chillers on/off, inefficient chiller operation during start-up, electricity required to operate valves, and/or any other economic costs which are incurred as a result of the state transition.

To make free cooling economically viable, the energy and cost savings achieved by free cooling should be sufficient to overcome the cost incurred as a result of transitioning between the mechanical cooling state and the free cooling state. Advantageously, HVAC system described herein can determine whether the use of free cooling would be economically viable by weighing the cost savings achieved by free cooling against the economic cost of performing the state transition. For example, free cooling may be economically viable only if the free cooling lasts for a minimum amount of time. The controller can predict how long the use of free cooling would last as well as the energy savings which would be achieved by the use of free cooling during the predicted free cooling period. The controller can weigh the predicted energy savings against the cost of performing the state transition to determine whether to transition into the free cooling state.

In some embodiments, the controller is configured to predict the outside air temperature $\hat{T}_{OA}$ (e.g., predicted outside air wet bulb temperature) for each of a plurality of time steps into the future. The controller can predict the outside air temperature $\hat{T}_{OA}$ using measurements from sensors and/or weather forecasts from a weather service. When operating in the mechanical cooling state, the controller can determine whether the predicted outside air temperature $\hat{T}_{OA}$ will be below a free cooling temperature threshold $T_{FC}$ for a predetermined amount of time in the future. The controller can transition from the mechanical cooling state to the free cooling state in response to a determination that the predicted outside air temperature $\hat{T}_{OA}$ will remain below the free cooling temperature threshold $T_{FC}$ for the predetermined amount of time.

In some embodiments, the free cooling temperature threshold $T_{FC}$ is a maximum outdoor air wet bulb temperature at which free cooling is possible or economically viable. The predetermined amount of time may be a minimum amount of time $t_{min,FC}$ which free cooling must last in order to justify the economic cost of transitioning into the free cooling state. If the predicted outside air temperature $\hat{T}_{OA}$ will not stay below the temperature threshold $T_{FC}$ for the predetermined amount of time $t_{min,FC}$, the controller can remain in the mechanical cooling state, even if the current outside air temperature $T_{OA}$ is below the temperature threshold $T_{FC}$. This prevents the HVAC system from transitioning into the free cooling state if the amount of time spent in the free cooling state and the corresponding energy savings are insufficient to overcome the cost incurred as a result of the state transition.

In some embodiments, a free cooling controller is used to optimize the performance of the HVAC system when operating in the free cooling state. Specifically, the free cooling controller can optimize the performance of a free cooling system (e.g., a free cooling subplant of the HVAC system) which uses free cooling to satisfy the cooling load $\dot{Q}_{load}$ of a building. The free cooling system may include a chilled water circuit which removes heat from the building at a rate of $\dot{Q}_{load}$ and a cooling tower circuit which removes heat from the chilled water circuit via a heat exchanger at a rate of $\dot{Q}_{HX}$. The cooling tower circuit can include a cooling tower, the heat exchanger, and one or more tower water pumps configured to circulate water between the heat exchanger and the cooling tower. The cooling tower may include one or more fans and may be configured to remove heat from the water in the cooling tower circuit at a rate of $\dot{Q}_{tower}$.

The free cooling controller can perform a multi-stage optimization process to estimate the power consumption of the HVAC devices in the free cooling system. In the first stage of the optimization process, the free cooling controller may determine the optimal flowrate $\dot{V}_{tower}$ for the water in the cooling tower circuit. The optimal flowrate $\dot{V}_{tower}$ may be defined as the flowrate that results in the heat exchanger transferring heat from the chilled water circuit to the cooling tower circuit at a rate of $\dot{Q}_{HX}=\dot{Q}_{load}$. In the second stage of the optimization process, the free cooling controller may determine the optimal airflow rate $\dot{V}_{air}$ through the cooling tower in order to satisfy the energy balance equation $\dot{Q}_{HX}-\dot{Q}_{tower}=0$. Once the optimal flowrates $\dot{V}_{tower}$ and $\dot{V}_{air}$ have been determined, the free cooling controller may compute the pressure drops across various components of the free cooling system. The free cooling controller can use the pressure drop information to calculate the power consumed by the tower water pumps and the cooling tower fans in order to satisfy the cooling load $\dot{Q}_{load}$. Additional features and advantages of the HVAC system are described in detail below.

Building HVAC Systems and Building Management Systems

Figure 2:
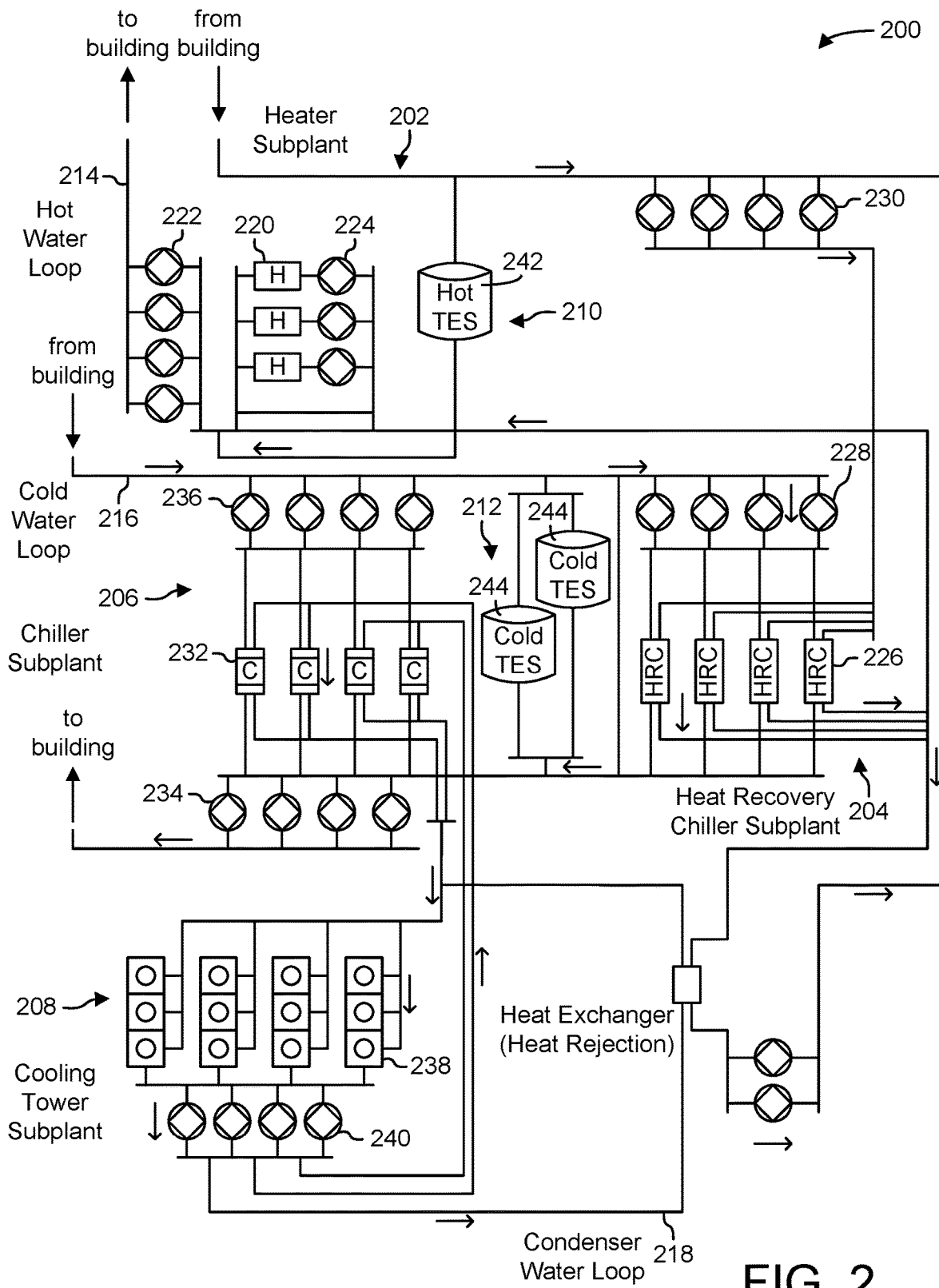
FIG. 2 is a drawing of a waterside system which can be used in combination with the HVAC system of FIG. 1, according to an exemplary embodiment.
Figure 3:
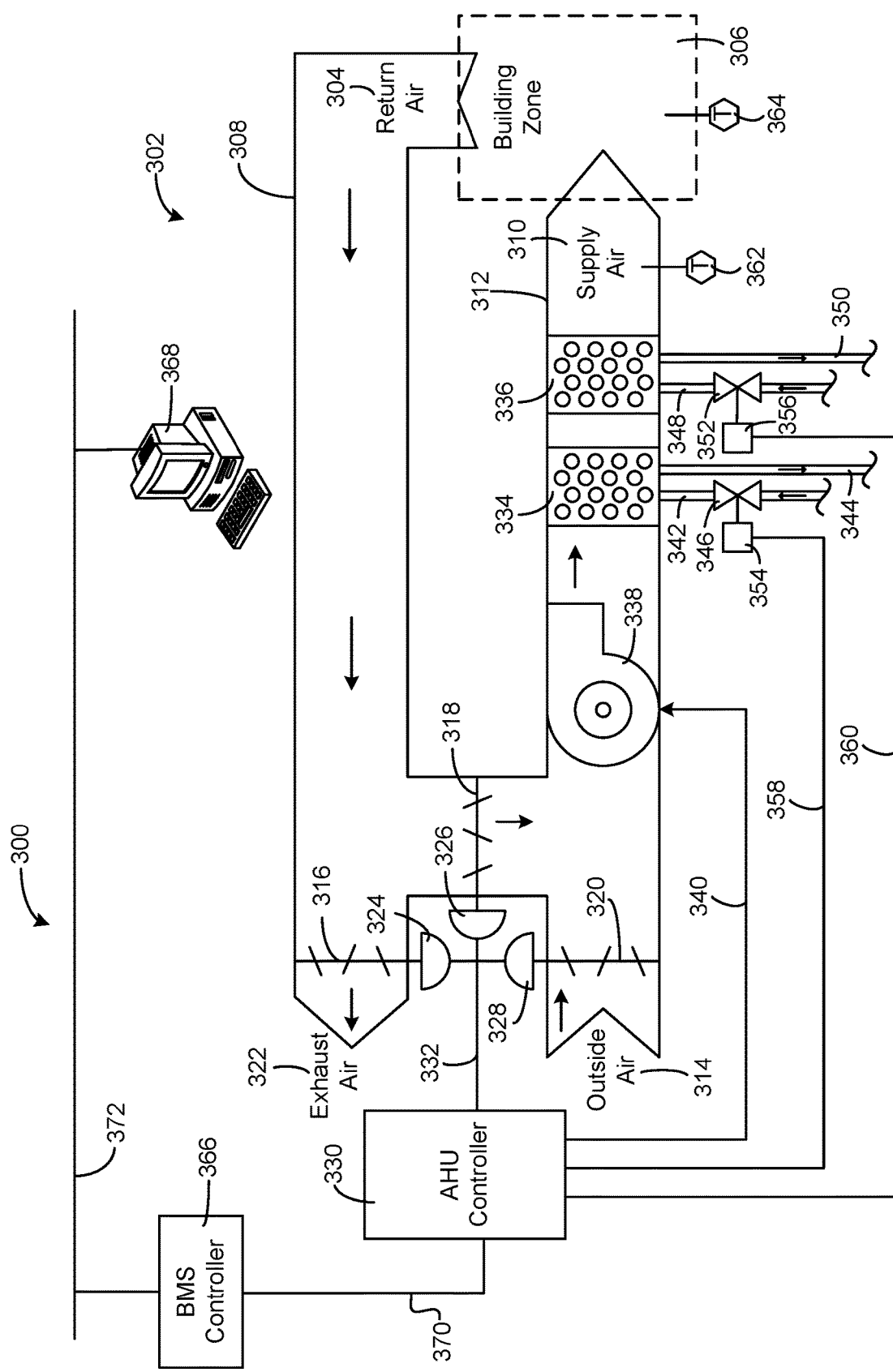
FIG. 3 is a drawing of an airside system which can be used in combination with the HVAC system of FIG. 1, according to an exemplary embodiment.
Figure 4:
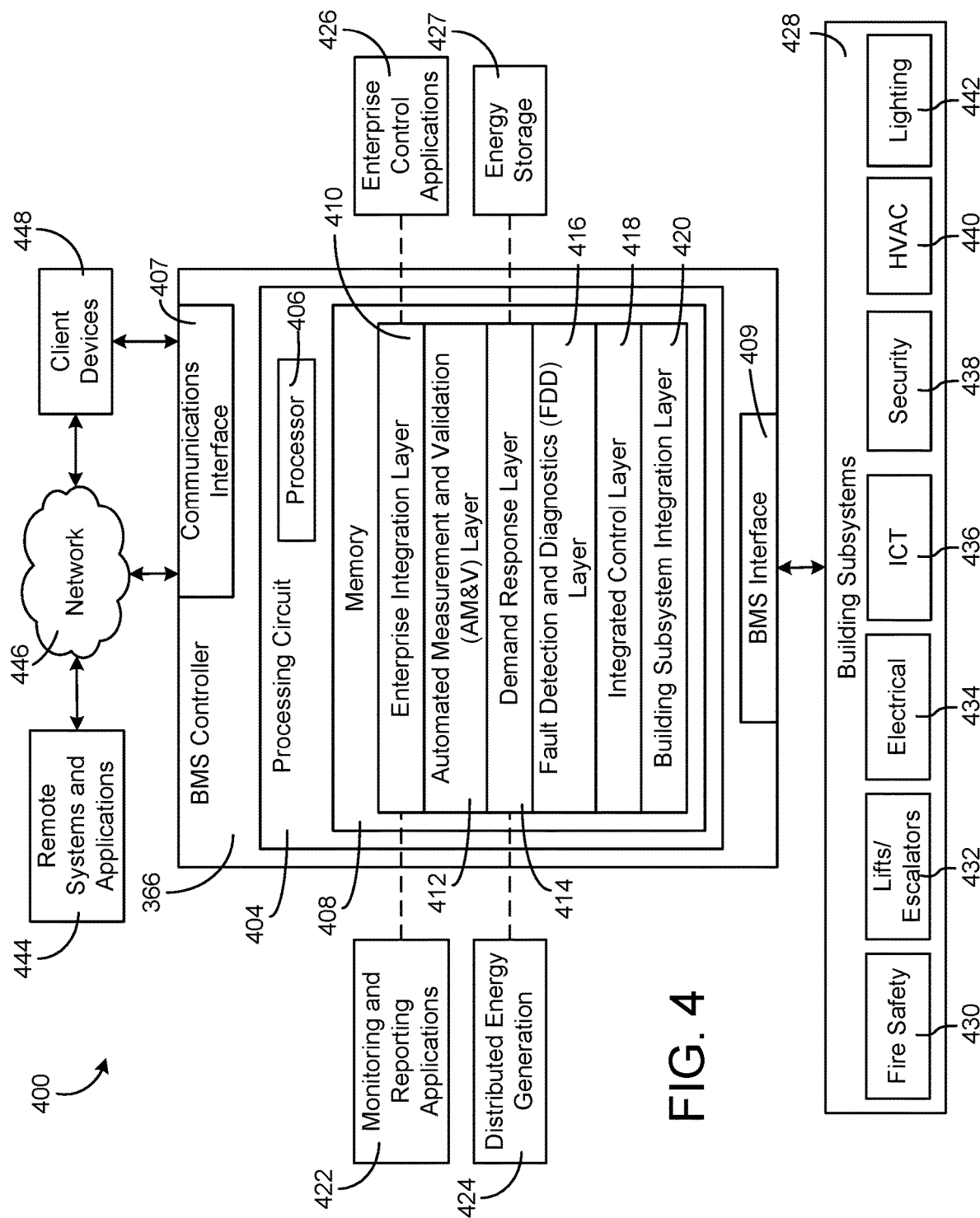
FIG. 4 is a block diagram of a building management system which can be used to monitor and control the building and HVAC system of FIG. 1, according to an exemplary embodiment.
Figure 5:
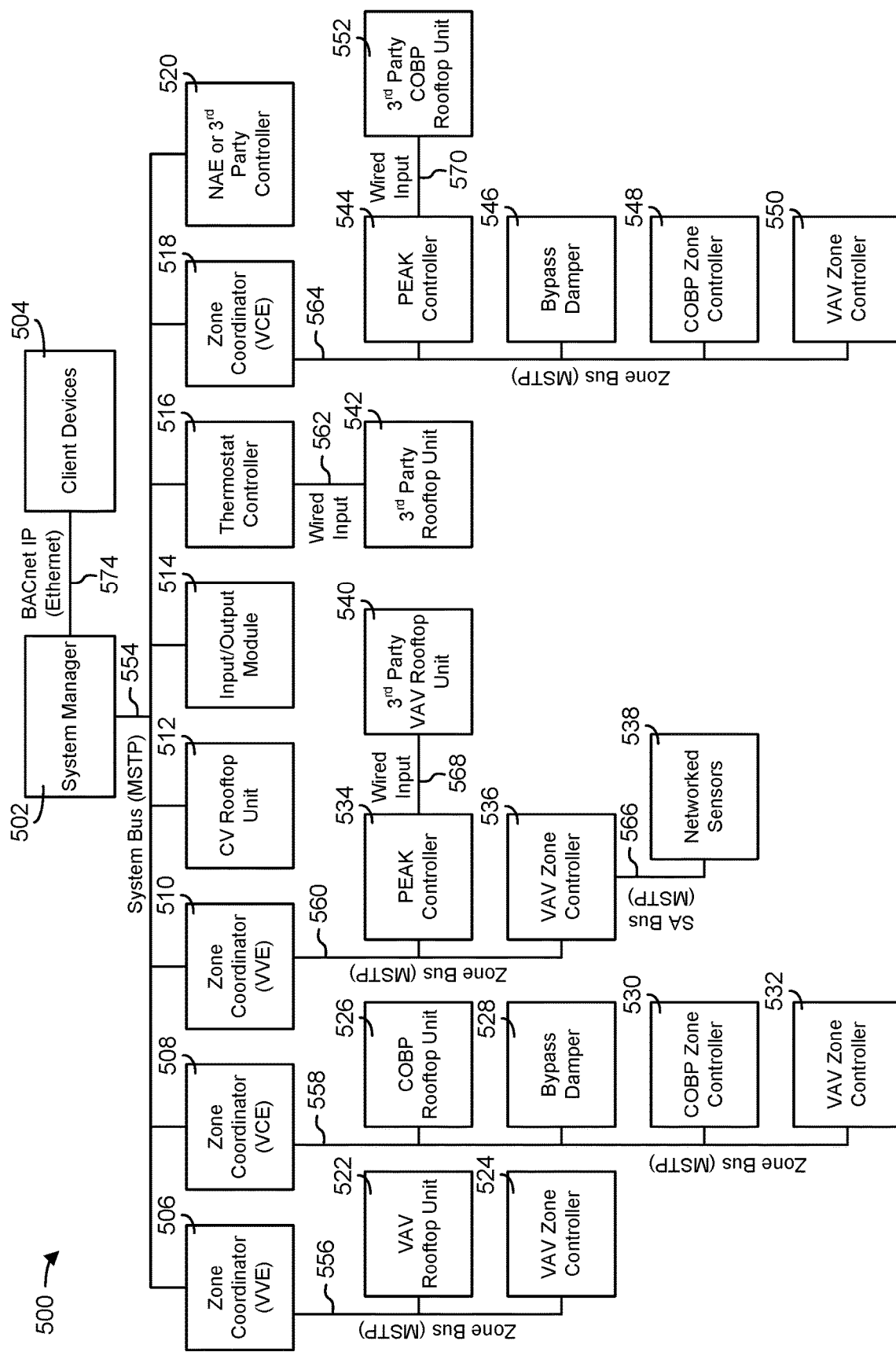
FIG. 5 is a block diagram of another building management system which can be used to monitor and control the building and HVAC system of FIG. 1, according to an exemplary embodiment.

Referring now to FIGS. 1-5, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10. FIG. 5 is a block diagram of another BMS which can be used to monitor and control building 10.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

In some embodiments, HVAC system 100 uses free cooling to cool the working fluid. For example, HVAC system 100 can include one or more cooling towers or heat exchangers which transfer heat from the working fluid to outside air. Free cooling can be used as an alternative or supplement to mechanical cooling via chiller 102 when the temperature of the outside air is below a threshold temperature. HVAC system 100 can switch between free cooling and mechanical cooling based on the current temperature of the outside air and/or the predicted future temperature of the outside air. An example of a free cooling system which can be used in HVAC system 100 is described in greater detail with reference to FIG. 6.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flowrate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flowrate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flowrate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flowrate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flowrate of the condenser water through individual cooling towers 238.

In some embodiments, waterside system 200 uses free cooling to cool the water in cold water loop 216. For example, the water returning from the building in cold water loop 216 can be delivered to cooling tower subplant 208 and through cooling towers 238. Cooling towers 238 can remove heat from the water in cold water loop 216 (e.g., by transferring the heat to outside air) to provide free cooling for the water in cold water loop 216. In some embodiments, waterside system 200 switches between free cooling with cooling tower subplant 208 and mechanical cooling with chiller subplant 208 based on the current temperature of the outside air and/or the predicted future temperature of the outside air. An example of a free cooling system which can be used in waterside system 200 is described in greater detail with reference to FIG. 6.

Hot TES subplant 210 is shown to include a hot TES tank 242 configured to store the hot water for later use. Hot TES subplant 210 may also include one or more pumps or valves configured to control the flowrate of the hot water into or out of hot TES tank 242. Cold TES subplant 212 is shown to include cold TES tanks 244 configured to store the cold water for later use. Cold TES subplant 212 may also include one or more pumps or valves configured to control the flowrate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flowrate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flowrate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flowrate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

In some embodiments, AHU controller 330 uses free cooling to cool supply air 310. AHU controller 330 can switch between free cooling and mechanical cooling by operating outside air damper 320 and cooling coil 334. For example, AHU controller 330 can deactivate cooling coil 334 and open outside air damper 320 to allow outside air 314 to enter supply air duct 312 in response to a determination that free cooling is economically optimal. AHU controller 330 can determine whether free cooling is economically optimal based on the temperature of outside air 314 and/or the predicted future temperature of outside air 314. For example, AHU controller 330 can determine whether the temperature of outside air 314 is predicted to be below a threshold temperature for a predetermined amount of time. An example of free cooling switching logic which can be used by AHU controller 330 is described in greater detail with reference to FIG. 10.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management Systems

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/output module (IOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

HVAC System with Free Cooling

Figure 6:
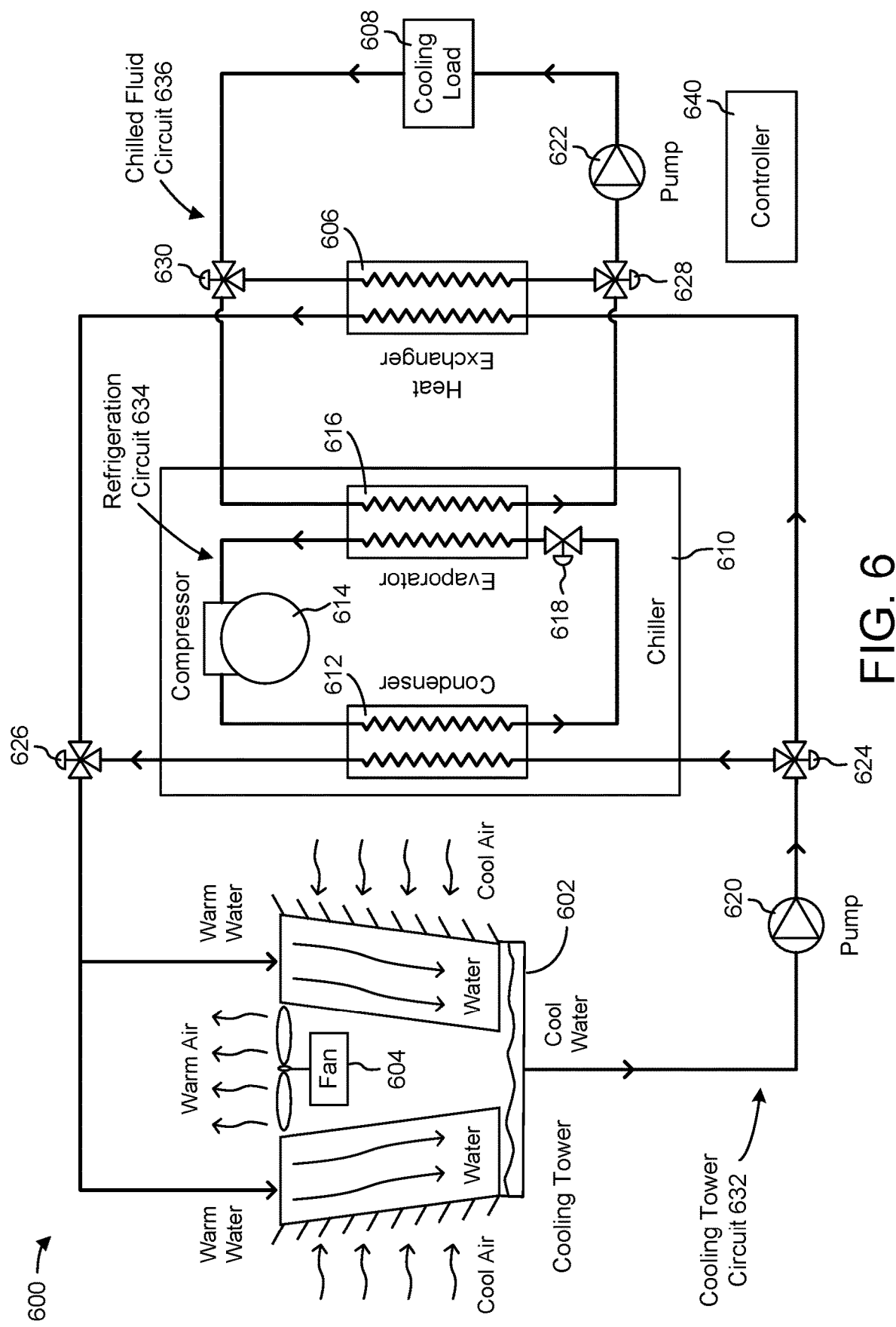
FIG. 6 is a block diagram of a HVAC system configured to operate in a mechanical cooling state and a free cooling state, according to an exemplary embodiment.

Referring now to FIG. 6, a block diagram of a HVAC system 600 with free cooling is shown, according to an exemplary embodiment. HVAC system 600 is configured to provide cooling to a cooling load 608. Cooling load 608 can include, for example, a building zone, a supply airstream flowing through an air duct, an airflow in an air handling unit or rooftop unit, fluid flowing through a heat exchanger, a refrigerator or freezer, a condenser or evaporator, a cooling coil, or any other type of system, device, or space which requires cooling. In some embodiments, a pump 622 circulates a chilled fluid to cooling load 608 via a chilled fluid circuit 636. The chilled fluid can absorb heat from cooling load 608, thereby providing cooling to cooling load 608 and warming the chilled fluid.

HVAC system 600 is shown to include a cooling tower 602, a heat exchanger 606, and a chiller 610. HVAC system 600 can operate in both a mechanical cooling state (shown in FIG. 7) and a free cooling state (shown in FIG. 8). HVAC system 600 can transition between the mechanical cooling state and free cooling state to provide economically optimal cooling for cooling load 608. In the mechanical cooling state, the chilled fluid exiting cooling load 608 is directed to an evaporator 616 of chiller 610. Chiller 610 operates to provide mechanical cooling (e.g., vapor compression cooling) for the chilled fluid in evaporator 616 by transferring heat from the chilled fluid to a refrigerant which circulates through evaporator 616 via a refrigeration circuit 634. In the free cooling state, the chilled fluid exiting cooling load 608 is directed to a heat exchanger 606. Heat exchanger 606 is configured to transfer heat from the chilled fluid to water (or any other coolant) which circulates through heat exchanger 606 via a cooling tower circuit 632.

Cooling tower 602 can be configured to cool the water in cooling tower circuit 632 by transferring heat from the water to outside air. In some embodiments, a pump 620 circulates water through cooling tower 602 via cooling tower circuit 632. Cooling tower 602 may include a fan 604 which causes cool air to flow through cooling tower 602. Cooling tower 602 places the cool air in a heat exchange relationship with the warmer water, thereby transferring heat from warmer water to the cooler air. In the mechanical cooling state, cooling tower 602 can provide cooling for a condenser 612 of chiller 610. Condenser 612 can transfer heat from the refrigerant in refrigeration circuit 634 to the water in cooling tower circuit 632. In the free cooling state, cooling tower 602 can provide cooling for heat exchanger 606. Heat exchanger 606 can transfer heat from the chilled fluid in chilled fluid circuit 636 to the water in cooling tower circuit 632. Although cooling tower circuit 632 is shown and described as circulating water, it should be understood that any type of coolant or working fluid (e.g., water, glycol, $CO_2$, etc.) can be used in cooling tower circuit 632.

Chiller 610 is shown to include a condenser 612, a compressor 614, an evaporator 616, and an expansion device 618. Compressor 614 can be configured to circulate a refrigerant between condenser 612 and evaporator 616 via refrigeration circuit 634. Compressor 614 operates to compress the refrigerant to a high pressure, high temperature state. The compressed refrigerant flows through condenser 612, which transfers heat from the refrigerant in refrigeration circuit 634 to the water in cooling tower circuit 632. The cooled refrigerant then flows through expansion device 618, which expands the refrigerant to a low temperature, low pressure state. The expanded refrigerant flows through evaporator 616, which transfers heat from the chilled fluid in chilled fluid circuit 636 to the refrigerant in refrigeration circuit 634.

In some embodiments, chiller 610 is active only when HVAC system operates in the mechanical cooling state. In the free cooling state, chiller 610 can be deactivated to reduce energy consumption. In some embodiments, HVAC system 600 includes multiple chillers 610. Each of chillers 610 can be arranged in parallel and configured to provide cooling for the fluid in chilled fluid circuit 636. Similarly, HVAC system 600 can include multiple cooling towers 602. Each of the cooling towers 602 can be arranged in parallel and configured to provide cooling for the water in cooling tower circuit 632.

Still referring to FIG. 6, HVAC system 600 is shown to include several valves 624, 626, 628, and 630. Valves 624-630 may be three-way valves which can be operated by a controller 640 to control the flow of the chilled fluid in chilled fluid circuit 636 and the water in cooling tower circuit 632. For example, when HVAC system 600 transitions into the mechanical cooling state, controller 640 can operate valves 628 and 630 to direct the chilled fluid exiting cooling load 608 through evaporator 616 and prevent the chilled fluid from flowing through heat exchanger 606. In the mechanical cooling state, controller 640 can operate valves 624 and 626 to direct the water exiting cooling tower 602 through condenser 612 and prevent the water from flowing through heat exchanger 606. Conversely, when HVAC system 600 transitions into the free cooling state, controller 640 can operate valves 628 and 630 to direct the chilled fluid exiting cooling load 608 through heat exchanger 606 and prevent the chilled fluid from flowing through evaporator 616. In the free cooling state, controller 640 can operate valves 624 and 626 to direct the water exiting cooling tower 602 through heat exchanger 606 and prevent the water from flowing through condenser 612.

Figure 7:
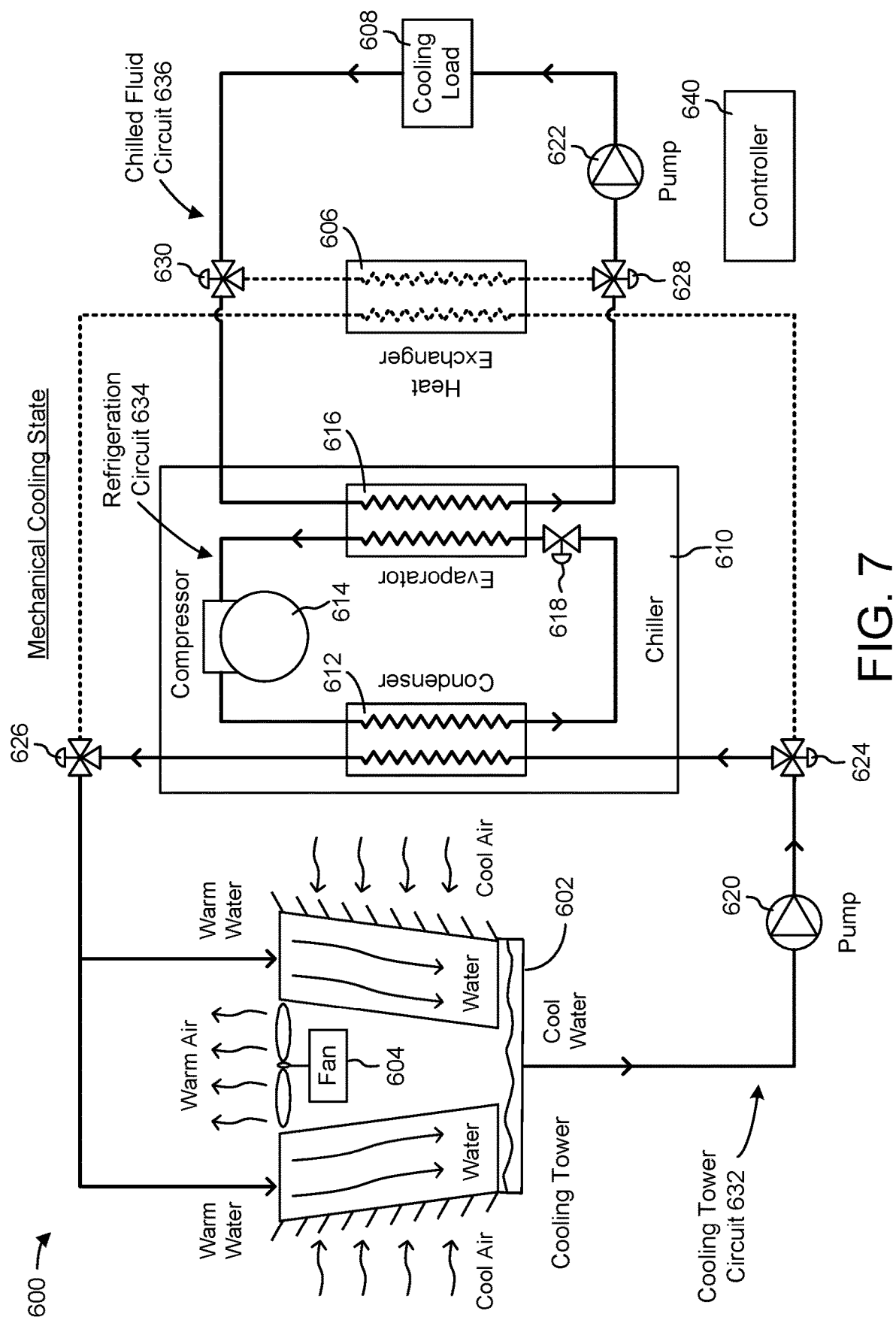
FIG. 7 is a block diagram illustrating operation of the HVAC system of FIG. 6 in the mechanical cooling state, according to an exemplary embodiment.

Referring now to FIG. 7, a block diagram illustrating the operation of HVAC system 600 in the mechanical cooling state is shown, according to an exemplary embodiment. In FIG. 7, the flow paths used in the mechanical cooling state are shown in solid lines, whereas the flow paths not used in the mechanical cooling state are shown in broken lines. In the mechanical cooling state, chiller 610 is used to provide cooling for the chilled fluid in chilled fluid circuit 636. Both chilled fluid circuit 636 and cooling tower circuit 632 are fluidly connected to chiller 610. Heat exchanger 606 is not used and the fluid conduits connecting to heat exchanger 606 are blocked.

In the mechanical cooling state, controller 640 operates valve 624 to direct the cool water from cooling tower 602 through condenser 612. Condenser 612 transfers heat from the refrigerant in refrigeration circuit 634 to the cool water in cooling tower circuit 632, thereby warming the water. The warm water then flows from condenser 612 to valve 626. Controller 640 operates valve 626 to direct the warm water to cooling tower 602. Cooling tower 602 transfers heat from the water to cooler air flowing through cooling tower 602. Controller 640 can operate fan 604 to modulate the airflow through cooling tower 602, which adjusts the rate of heat transfer in cooling tower 602. Controller 640 can also operate pump 620 to modulate the flowrate of the water through cooling tower circuit 632, which adjusts the rate of heat transfer in cooling tower 602 and/or condenser 612.

In the mechanical cooling state, controller 640 operates valve 630 to direct the fluid exiting cooling load 608 through evaporator 616. Evaporator 616 transfers heat from the fluid in chilled fluid circuit 636 to the refrigerant in refrigeration circuit 634, thereby chilling the fluid in chilled fluid circuit 636. The chilled fluid then flows from evaporator 616 to valve 628. Controller 640 operates valve 628 to direct the chilled fluid to cooling load 608. Cooling load 608 rejects heat to the chilled fluid, thereby providing cooling for cooling load 608 and warming the chilled fluid. Controller 640 can operate pump 622 to modulate the flowrate of the chilled fluid through chilled fluid circuit 636, which adjusts the rate of heat transfer in evaporator 616 and/or at cooling load 608.

Figure 8:
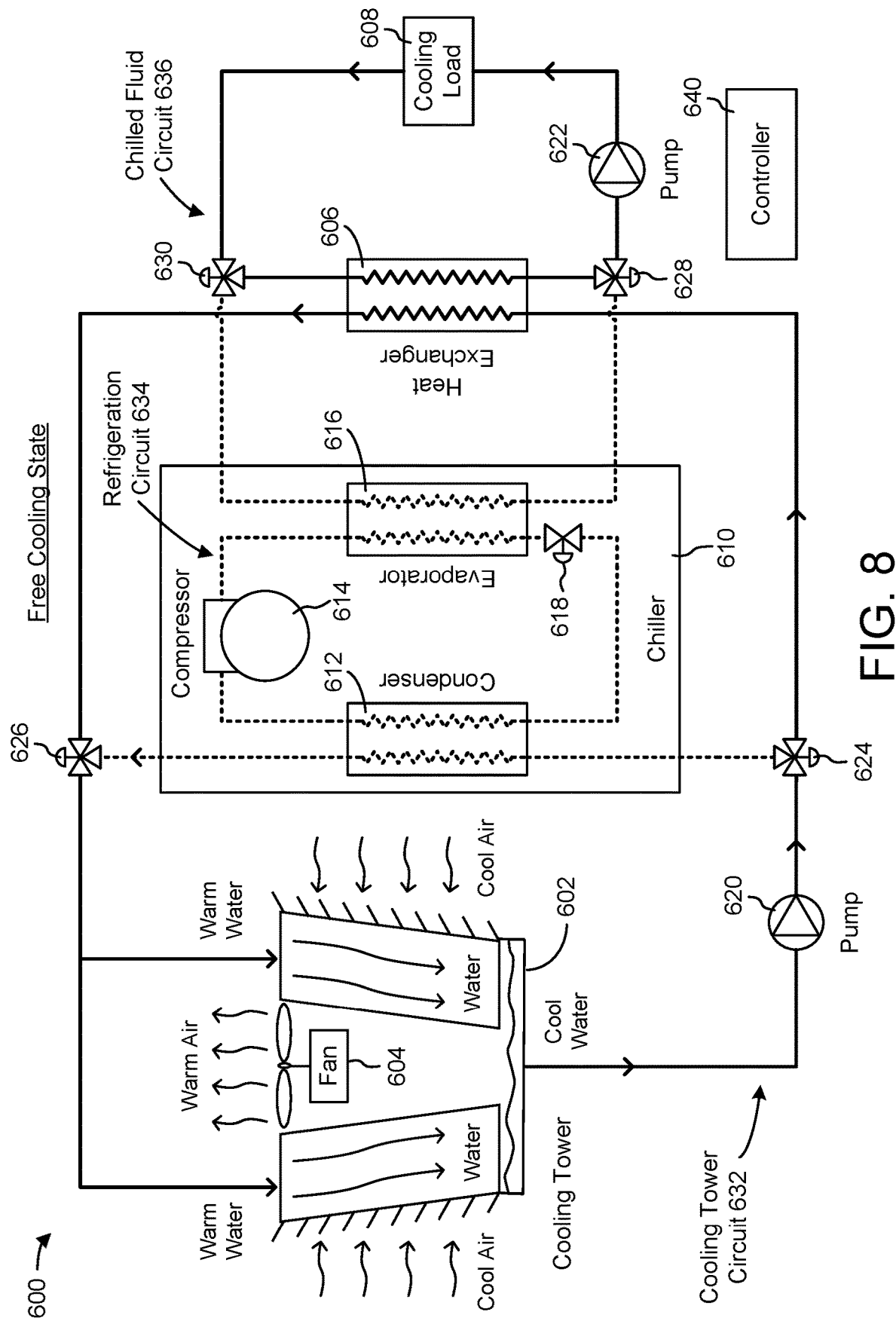
FIG. 8 is a block diagram illustrating operation of the HVAC system of FIG. 6 in the free cooling state, according to an exemplary embodiment.

Referring now to FIG. 8, a block diagram illustrating the operation of HVAC system 600 in the free cooling state is shown, according to an exemplary embodiment. In FIG. 8, the flow paths used in the free cooling state are shown in solid lines, whereas the flow paths not used in the free cooling state are shown in broken lines. In the free cooling state, heat exchanger 606 is used to provide cooling for the chilled fluid in chilled fluid circuit 636. Both chilled fluid circuit 636 and cooling tower circuit 632 are fluidly connected to heat exchanger 606. Chiller 610 is not used and the fluid conduits connecting to chiller 610 are blocked.

In the free cooling state, controller 640 operates valve 624 to direct the cool water from cooling tower 602 through heat exchanger 606. Heat exchanger 606 transfers heat from the fluid in chilled fluid circuit to the cool water in cooling tower circuit 632, thereby warming the water. The warm water then flows from heat exchanger 606 to valve 626. Controller 640 operates valve 626 to direct the warm water to cooling tower 602. Cooling tower 602 transfers heat from the water to cooler air flowing through cooling tower 602. Controller 640 can operate fan 604 to increase or decrease the airflow through cooling tower 602, which increases or decreases the rate of heat transfer in cooling tower 602. Controller 640 can also operate pump 620 to modulate the flowrate of the water through cooling tower circuit 632, which adjusts the rate of heat transfer in cooling tower 602 and/or heat exchanger 606.

In the free cooling state, controller 640 operates valve 630 to direct the fluid exiting cooling load 608 through heat exchanger 606. Heat exchanger 606 transfers heat from the fluid in chilled fluid circuit 636 to the water in cooling tower circuit 632, thereby chilling the fluid in chilled fluid circuit 636. The chilled fluid then flows from heat exchanger 606 to valve 628. Controller 640 operates valve 628 to direct the chilled fluid to cooling load 608. Cooling load 608 rejects heat to the chilled fluid, thereby providing cooling for cooling load 608 and warming the chilled fluid. Controller 640 can operate pump 622 to modulate the flowrate of the chilled fluid through chilled fluid circuit 636, which adjusts the rate of heat transfer in heat exchanger 606 and/or at cooling load 608.

HVAC Controller

Figure 9:
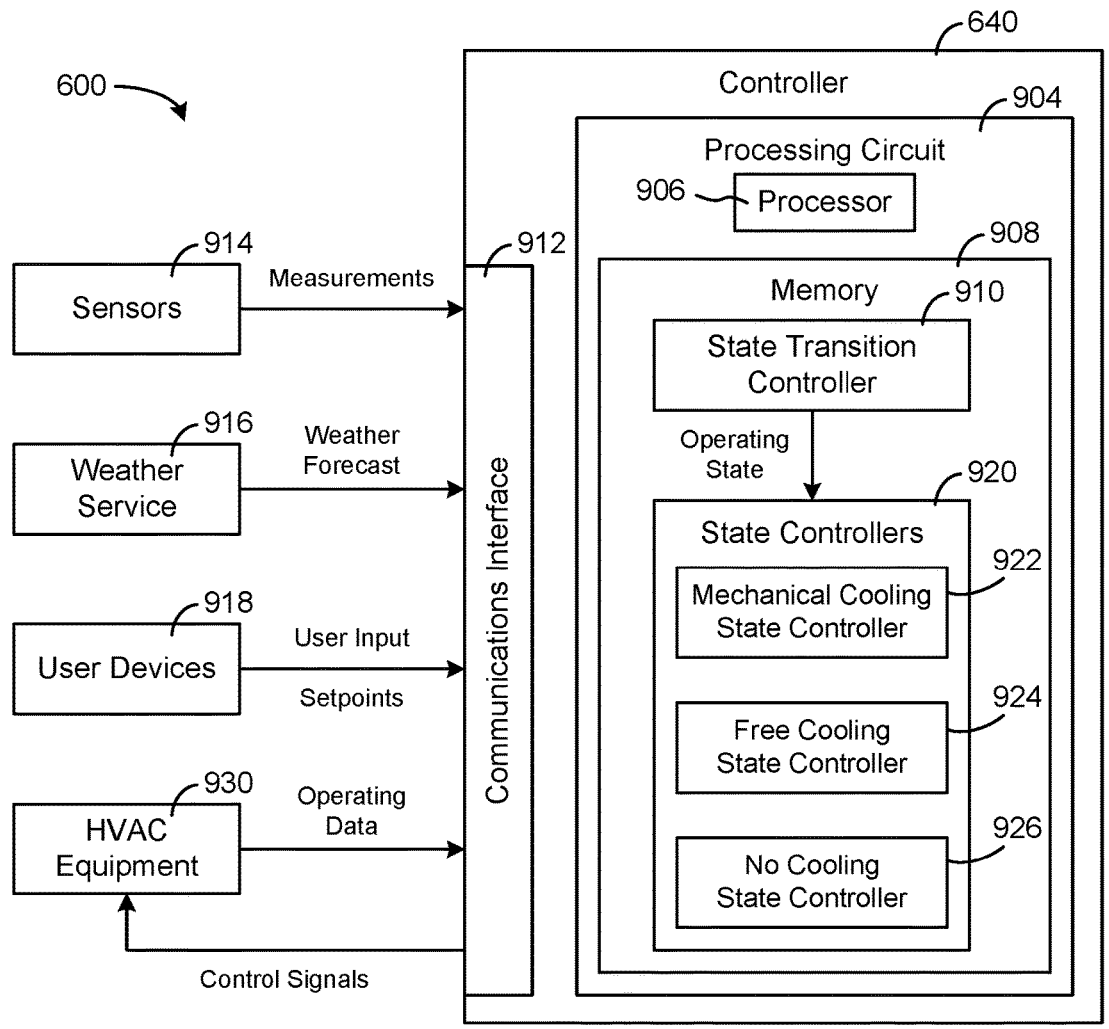
FIG. 9 is a block diagram illustrating a portion of the HVAC system of FIG. 6 in greater detail, according to an exemplary embodiment.

Referring now to FIG. 9, a block diagram illustrating a portion of HVAC system 600 and controller 640 in greater detail is shown, according to an exemplary embodiment. In brief overview, controller 640 receives measurements from sensors 914 and weather forecasts from a weather service 916. Controller 640 uses the sensor measurements and weather forecasts to determine an operating state for HVAC system 600. For example, controller 640 can determine whether to transition into a mechanical cooling state, a free cooling state, or a no cooling state. Controller 640 can generate and provide control signals for HVAC equipment 930 (e.g., valves 624-630, chiller 610, etc.). HVAC equipment 930 operate to affect an environmental condition in a building (e.g., temperature, humidity, airflow, etc.), which can be measured by sensors 914 and provided as a feedback to controller 640.

Controller 640 can be any type of controller in a HVAC system or BMS. In some embodiments, controller 640 is a zone controller configured to monitor and control a building zone. For example, controller 640 can be a zone temperature controller, a zone humidity controller, a zone lighting controller, a VAV zone controller (e.g., VAV zone controllers 524, 532, 536, 550), a COBP zone controller (e.g., COPB controller 530, 548), or any other type of controller for a building zone. In other embodiments, controller 640 is a system controller or subsystem controller. For example, controller 640 can be a BMS controller (e.g., BMS controller 366), a central plant controller, a subplant controller, a supervisory controller for a HVAC system or any other type of building subsystem (e.g., a controller for any of building subsystems 428). In some embodiments, controller 640 is a field controller or device controller configured to monitor and control the performance of a set of HVAC devices or other building equipment. For example, controller 640 can be an AHU controller (e.g., AHU controller 330), a thermostat controller (e.g., thermostat controller 516), a rooftop unit controller, a chiller controller, a damper controller, or any other type of controller in a HVAC system or BMS.

In some embodiments, controller 640 is a hybrid controller which combines the functionality of a discrete control system and a closed loop control system. A discrete control system can be described using a finite state diagram (FSD) and implemented in a finite state machine (FSM). In a discrete control system, a controller evaluates state transition conditions (e.g., using feedback from the controlled system) and transitions between various operating states when one or more of the state transition conditions are satisfied. Each of the operating states in a discrete control system can have a corresponding set of control outputs. In some embodiments, the control outputs in a discrete control system remain constant as long as the controller remains in the same operating state and change only when the controller transitions into a new operating state.

A closed loop control system can be implemented using any of a variety of control techniques (e.g., feedback control, feedforward control, extremum seeking control, proportional-integral control, proportional-integral-derivative control, model predictive control, etc.). In a closed loop control system, a controller modulates a control output (i.e., a manipulated variable) provided to the controlled system over a range of values in order to achieve a desired effect. For example, the controller can modulate the control output to drive a monitored variable to a setpoint. In some embodiments, the controller uses feedback from the controlled system to determine an error between the setpoint and the monitored variable. The controller can variably increase or decrease the control output within the range of values in order to drive the error to zero.

Controller 640 can include both discrete control elements and closed loop control elements. For example, controller 640 is shown to include a state transition controller 910 and a plurality of state controllers 920 (i.e., mechanical cooling state controller 922, free cooling state controller 924, and no cooling state controller 926). State transition controller 910 can operate as a finite state machine to evaluate state transition conditions and transition between various operating states. The state transition conditions and the logic used by state transition controller 910 can be stored in a database for later retrieval. In some embodiments, state transition controller 910 provides an indication of the current operating state to state controllers 920. State transition controller 910 is described in greater detail below.

Each of state controllers 920 can operate as a closed loop controller within a particular operating state. In some embodiments, each state controller 920 becomes active when state transition controller 910 transitions into the corresponding operating state and inactive when state transition controller 910 transitions out of the corresponding operating state. In some embodiments, each of state controllers 920 uses a different control algorithm and/or different control logic. This allows controller 640 to function as multiple different controllers, each of which controls the operation of system 600 in a particular operating state. State controllers 920 are described in greater detail below.

Still referring to FIG. 9, HVAC system 600 is shown to include sensors 914, weather service 916, user devices 918, and HVAC equipment 930. Sensors 914 can include any of a variety of sensors configured to measure a variable state or condition in a building. For example, sensors 914 can include temperature sensors, humidity sensors, airflow sensors, lighting sensors, pressure sensors, voltage sensors, or any other type of sensor. Sensors 914 can be distributed throughout a building and configured to measure various environmental conditions at different locations in the building. For example, one of sensors 914 can be located in a first zone of the building and configured to measure the temperature of the first zone, whereas another of sensors 914 can be located in a second zone of the building and configured to measure the temperature of the second zone. Similarly, sensors 914 can be distributed throughout a HVAC system and configured to measure conditions at different locations in the HVAC system. For example, one of sensors 914 can be a supply air temperature sensor configured to measure the temperature of the airflow provided to a building zone from an AHU, whereas another of sensors 914 can be a return air temperature sensor configured to measure the temperature of the airflow returning from the building zone to the AHU.

In some embodiments, sensors 914 include outdoor air sensors configured to measure the temperature, pressure, humidity, or other attributes of the air outside the building. Sensors 914 can provide measurements as inputs to controller 640 via communications interface 902. In some embodiments, sensors 914 provide a feedback signal to controller 640 indicating the value of a variable of interest in the controlled system (e.g., building zone temperature, building zone humidity, system power consumption, etc.) or outside the controlled system (e.g., outdoor air temperature). Controller 640 can use the measurements from sensors 914 to evaluate state transition conditions and/or to perform closed loop control operations within various operating states.

Weather service 916 can be configured to provide weather forecasts to controller 640. The weather forecasts can include temperature forecasts, humidity forecasts, wind forecasts, rain or snow forecasts, or any other type of weather forecast. Controller 640 can use the weather forecasts to predict the temperature, humidity, wet bulb temperature, or other attributes of the outdoor air at a plurality of future times. In some embodiments, controller 640 uses the predicted attributes of the outdoor air to evaluate state transition conditions and/or to perform closed loop control operations within various operating states. The logic used by controller 640 to evaluate state transition conditions and perform state transitions is described in greater detail below.

User devices 918 can include any of a variety of user-operable devices configured to facilitate user interaction with controller 640 and/or HVAC system. For example, user devices 918 can include a computer workstation, a desktop computer, a laptop computer, a tablet, a smartphone, a PDA, or any other type of mobile or non-mobile device. User devices 918 can include user interface elements (e.g., electronic display screens, touchscreen displays, keyboards, speakers, buttons, dials, etc.) configured to receive input from a user and provide output to a user. User devices 918 can interact with controller 640 via communications interface 912 to monitor system operation and provide input to controller 640. For example, user devices 918 can allow a user to provide controller 640 with setpoints, operating parameters, manual values for measured variables, operating commands, manual state transition commands, and/or other types of user input. Controller 640 can use the input from user devices 918 to evaluate state transition conditions and/or to perform closed loop control operations within various operating states.

HVAC equipment 930 can include any of a variety of controllable systems or devices in HVAC system 600. For example, HVAC equipment 930 can include cooling tower 602, fan 604, chiller 610, pumps 620-622, and/or valves 624-630. HVAC equipment 930 can include any of the systems or devices of HVAC system 100, waterside system 200, or airside system 300, as described with reference to FIGS. 1-3. For example, HVAC equipment 930 can include one or more chillers, boilers, AHUs, economizers, controllers, actuators, fans, pumps, electronic valves, and/or other types of equipment which can be operated by controller 640 to affect a variable state or condition (e.g., temperature, humidity, airflow, lighting, etc.) in or around building 10.

HVAC equipment 930 can include any of the systems or devices of building subsystems 428 as described with reference to FIG. 4 and/or any of the systems or devices of BMS 500 as described with reference to FIG. 5 (e.g., zone coordinators, rooftop units, VAV units, bypass dampers, etc.). HVAC equipment 930 can provide operating data to controller 640 and can receive control signals from controller 640. In some embodiments, HVAC equipment 930 operate according to the control signals to affect one or more of the variables measured by sensors 914.

Still referring to FIG. 9, controller 640 is shown to include a communications interface 912 and a processing circuit 904. Communications interface 912 can include wired or wireless interfaces (e.g., jacks, antennas, transmitters, receivers, transceivers, wire terminals, etc.) for conducting data communications with various systems, devices, or networks. For example, communications interface 912 can include an Ethernet card and port for sending and receiving data via an Ethernet-based communications network and/or a WiFi transceiver for communicating via a wireless communications network. Communications interface 912 can be configured to communicate via local area networks or wide area networks (e.g., the Internet, a building WAN, etc.) and may use a variety of communications protocols (e.g., BACnet, IP, LON, etc.).

Communications interface 912 can be a network interface configured to facilitate electronic data communications between controller 640 and various external systems or devices (e.g., sensors 914, weather service 916, user devices 918, HVAC equipment 930, etc.). For example, controller 640 can receive setpoints and operating parameters from a supervisory controller (e.g., BMS controller 366, system manager 502, etc.) via communications interface 912. Controller 640 can receive measurements from sensors 914 via communications interface 912. Controller 640 can use communications interface 912 to send control signals to HVAC equipment 930. In some embodiments, controller 640 provides user interfaces and other information to user devices 918 via communications interface 912.

Processing circuit 904 is shown to include a processor 906 and memory 908. Processor 906 can be a general purpose or specific purpose processor, an application specific integrated circuit (ASIC), one or more field programmable gate arrays (FPGAs), a group of processing components, or other suitable processing components. Processor 906 can be configured to execute computer code or instructions stored in memory 908 or received from other computer readable media (e.g., CDROM, network storage, a remote server, etc.).

Memory 908 can include one or more devices (e.g., memory units, memory devices, storage devices, etc.) for storing data and/or computer code for completing and/or facilitating the various processes described in the present disclosure. Memory 908 can include random access memory (RAM), read-only memory (ROM), hard drive storage, temporary storage, non-volatile memory, flash memory, optical memory, or any other suitable memory for storing software objects and/or computer instructions. Memory 908 can include database components, object code components, script components, or any other type of information structure for supporting the various activities and information structures described in the present disclosure. Memory 908 can be communicably connected to processor 906 via processing circuit 904 and can include computer code for executing (e.g., by processor 906) one or more processes described herein.

State Transitions and Operating States

Figure 10:
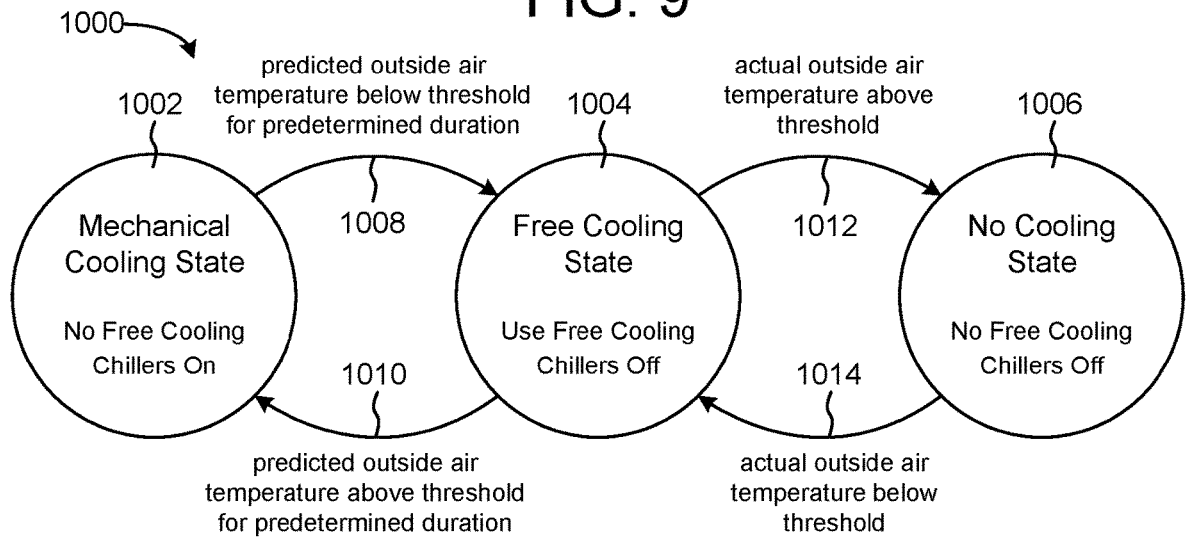
FIG. 10 is a state transition diagram illustrating the state transitions and transition conditions used by the HVAC system of FIG. 6, according to an exemplary embodiment.

Referring now to FIG. 10, a state transition diagram 1000 illustrating the operation of HVAC system 600 is shown, according to an exemplary embodiment. State transition diagram 1000 is shown to include a plurality of operating states 1002-1006 (i.e., a mechanical cooling state 1002, a free cooling state 1004, and a no cooling state 1006) and state transition conditions 1008-1014. Although only three operating states 1002-1006 are shown in state transition diagram 1000, it should be understood that state transition diagram 1000 can include any number of operating states to model systems of various complexity. In some embodiments, various sub-states can be nested within one or more of operating states 1002-1006. However, such sub-states are omitted from state transition diagram 1000 for simplicity.

State transition controller 910 can evaluate state transition conditions 1008-1014 and can transition between operating states 1002-1006 based on a result of the evaluation. State transition conditions 1008-1014 can involve time comparisons and/or value comparisons. In traditional free cooling systems, free cooling is typically used whenever the outdoor air temperature is below a minimum temperature required for free cooling. However, the traditional approach does not take into account the economic cost associated with transitioning between operating states. For example, switching between mechanical cooling state 1002 and free cooling state 1004 may incur an economic cost. The economic cost may result from increased electricity consumption when chiller 610 is starting-up, increased equipment degradation resulting from switching chiller 610 on/off, inefficient chiller operation while chiller 610 is starting-up, electricity required to operate valves 624-630, and/or any other economic costs which are incurred as a result of the state transition.

To make free cooling economically viable, the energy and cost savings achieved by free cooling should be sufficient to overcome the cost incurred as a result of transitioning between mechanical cooling state 1002 and free cooling state 1004. Advantageously, state transition controller 910 can determine whether the use of free cooling would be economically viable by weighing the cost savings achieved by free cooling against the economic cost of performing the state transition. For example, free cooling may be economically viable only if the free cooling lasts for a minimum amount of time. State transition controller 910 can predict how long the use of free cooling would last as well as the energy savings which would be achieved by the use of free cooling during the predicted free cooling period. State transition controller 910 can weigh the predicted energy savings against the cost of performing the state transition to determine whether to transition into free cooling state 1004.

In some embodiments, state transition controller 910 is configured to predict the outside air temperature $\hat{T}_{OA}$ (e.g., predicted outside air wet bulb temperature) for each of a plurality of time steps into the future. State transition controller 910 can predict the outside air temperature $\hat{T}_{OA}$ using measurements from sensors 914 and/or weather forecasts from weather service 916. When operating in mechanical cooling state 1002, state transition controller 910 can determine whether the predicted outside air temperature $\hat{T}_{OA}$ will be below a free cooling temperature threshold $T_{FC}$ for a predetermined amount of time in the future (transition condition 1008). State transition controller 910 can transition from mechanical cooling state 1002 to free cooling state 1004 in response to a determination that state transition condition 1008 is satisfied.

In some embodiments, the free cooling temperature threshold $T_{FC}$ is a maximum outdoor air wet bulb temperature at which free cooling is possible or economically viable. The predetermined amount of time may be a minimum amount of time $t_{min,FC}$ which free cooling must last in order to justify the economic cost of transitioning into free cooling state 1004. If the predicted outside air temperature $\hat{T}_{OA}$ will not stay below the temperature threshold $T_{FC}$ for the predetermined amount of time $t_{min,FC}$, state transition controller 910 can remain in mechanical cooling state 1002, even if the current outside air temperature $T_{OA}$ is below the temperature threshold $T_{FC}$. This prevents state transition controller 910 from transitioning into free cooling state 1004 if the amount of time spent in free cooling state 1004 and the corresponding energy savings are insufficient to overcome the cost incurred as a result of the state transition.

In some embodiments, state transition controller 910 calculates the minimum free cooling time $t_{min,FC}$. State transition controller 910 can calculate the minimum free cooling time $t_{min,FC}$ by weighing the free cooling energy savings against the cost incurred as a result of switching from mechanical cooling state 1002 to free cooling state 1004. For example, state transition controller 910 can use the following equation to calculate the economic value of transitioning into free cooling state 1004 and operating in free cooling state 1004:

$$\text{Value}_{FC} = \Delta t_{FC} \text{Cost}_{elec} P_{elec} - \text{SwitchingPenalty}$$

where $\text{Value}_{FC}$ is the total economic value of transitioning into free cooling state 1004 and operating in free cooling state 1004 during the predicted free cooling period, $\Delta t_{FC}$ is the duration of the free cooling period (i.e., the predicted amount of time which will be spent in free cooling state 1004), $\text{Cost}_{elec}$ is the estimated per unit cost of electricity during the free cooling period $$\left(\text{e.g., } \frac{\$}{\text{kWh}}\right).$$

$P_{elec}$ is the estimated free cooling energy savings per unit time during the free cooling period (e.g., kW), and SwitchingPenalty is the economic or monetary cost (e.g., \$) incurred as a result of switching from mechanical cooling state 1002 to free cooling state 1004.

In the previous equation, the term $\Delta t_{FC} \text{Cost}_{elec} P_{elec}$ represents the cost savings resulting from the use of free cooling relative to mechanical cooling over the duration of the free cooling period. For example, the product of energy cost $\text{Cost}_{elec}$ $$\left(\text{e.g., } \frac{\$}{\text{kWh}}\right)$$

and energy savings per unit time $P_{elec}$ (e.g., kW) represents the economic cost of electricity which is saved by the use of free cooling during each time step of the free cooling period $$\left(\text{e.g., } \frac{\$}{\text{hour}}\right).$$

Multiplying this savings per unit time by the duration of the free cooling period $\Delta t_{FC}$ (e.g., hours) results in the total cost savings over the duration of the free cooling period. The term SwitchingPenalty represents the economic cost incurred as a result of the state transition. As previously described, the economic cost may result from increased electricity consumption during chiller start-up or shut-down, increased equipment degradation resulting from switching chiller 610 on/off, inefficient chiller operation while chiller 610 is starting-up or shutting-down, electricity required to operate valves 624-630, and/or any other economic costs which are incurred as a result of the state transition.

State transition controller 910 can calculate the minimum free cooling time $t_{min,FC}$ by finding the duration of the free cooling period $\Delta t_{FC}$ which results in a total economic value of zero (i.e., Value=0). For example, state transition controller 910 can solve the following equation to calculate the minimum free cooling time $t_{min,FC}$:

$$0 = t_{min,FC} \text{Cost}_{elec} P_{elec} - \text{SwitchingPenalty}$$

$$t_{min,FC} = \frac{\text{SwitchingPenalty}}{\text{Cost}_{elec} P_{elec}}$$

where the values of $\text{Cost}_{elec}$, $P_{elec}$, and SwitchingPenalty have known values. The value of SwitchingPenalty can be fixed, whereas the value of $\text{Cost}_{elec}$ can be received from an energy utility or predicted based past costs of electricity. The value of $P_{elec}$ can be predicted or estimated based on the amount of cooling required by cooling load 608.

When operating in free cooling state 1004, state transition controller 910 can determine whether the predicted outside air temperature $\hat{T}_{OA}$ will be above the temperature threshold $T_{FC}$ for a predetermined amount of time in the future (transition condition 1010). State transition controller 910 can transition from free cooling state 1004 to mechanical cooling state 1002 in response to a determination that state transition condition 1010 is satisfied. The predetermined amount of time in state transition condition 1010 can be a minimum mechanical cooling time $t_{min,MC}$ required to justify transitioning into mechanical cooling state 1002. The minimum mechanical cooling time $t_{min,MC}$ in state transition condition 1010 can be the same or different from the minimum free cooling time $t_{min,FC}$ in state transition condition 1008.

When operating in free cooling state 1004, state transition controller 910 can determine whether the actual outside air temperature $T_{OA}$ is above the temperature threshold $T_{FC}$ (transition condition 1012). State transition controller 910 can transition from free cooling state 1004 to no cooling state 1006 in response to a determination that state transition condition 1012 is satisfied. In no cooling state 1006, neither free cooling nor mechanical cooling are used. A transition into no cooling state 1006 may occur when the outside air temperature $T_{OA}$ is above the free cooling temperature threshold $T_{FC}$, but is not predicted to remain above the temperature threshold $T_{FC}$ for the minimum amount of time $t_{min,MC}$ required to justify switching back to mechanical cooling. State transition controller 910 may remain in no cooling state 1006 until the actual outside air temperature $T_{OA}$ drops below the temperature threshold $T_{FC}$.

When operating in no cooling state 1006, state transition controller 910 can determine whether the actual outside air temperature $T_{OA}$ is below the temperature threshold $T_{FC}$ (transition condition 1014). State transition controller 910 can transition from no cooling state 1006 to free cooling state 1004 in response to a determination that state transition condition 1012 is satisfied. In some embodiments, state transition controller 910 transitions from no cooling state 1006 to mechanical cooling state 1002 in response to a determination that the predicted outside air temperature $\hat{T}_{OA}$ will be above the temperature threshold $T_{FC}$ for an amount of time exceeding the minimum mechanical cooling time $t_{min,MC}$. However, such a state transition may not be necessary because state transition controller 910 may not operate in no cooling state 1006 unless the outside air temperature $T_{OA}$ is predicted to drop below the temperature threshold $T_{FC}$ within the minimum mechanical cooling time $t_{min,MC}$.

Each of state controllers 920 can operate as a closed loop controller within the corresponding operating state 1002-1006. For example, mechanical cooling state controller 922 can control system operation in mechanical cooling state 1002, free cooling state controller 924 can control system operation in free cooling state 1004, and no cooling state controller 926 can control system operation in no cooling state 1006. In some embodiments, each of state controllers 920 becomes active in response to a determination that state transition controller 910 has transitioned into the corresponding operating state and inactive in response to a determination that state transition controller 910 has transitioned out of the corresponding operating state. For example, mechanical cooling state controller 922 can become active in response to a determination that state transition controller 910 has transitioned into mechanical cooling state 1002 and inactive in response to a determination that state transition controller 910 has transitioned out of mechanical cooling state 1002. Similarly, free cooling state controller 924 can become active in response to a determination that state transition controller 910 has transitioned into free cooling state 1004 and inactive in response to a determination that state transition controller 910 has transitioned out of free cooling state 1004.

In some embodiments, each of state controllers 920 uses a different control algorithm, different control logic, and/or a different control methodology (e.g., PID control, extremum seeking control, model predictive control, etc.). This allows controller 640 to function as multiple different controllers, each of which controls the operation of HVAC system 600 in a designated operating state. For example, mechanical cooling state controller 922 can control system operation in mechanical cooling state 1002 by activating chiller 610 and using chiller 610 to provide cooling for cooling load 608, as described with reference to FIG. 7. Free cooling state controller 924 can control system operation in free cooling state 1004 by deactivating chiller 610 and using cooling tower 602 to directly cool the chilled fluid in chilled fluid circuit 636, as described with reference to FIG. 8.

Predictive Free Cooling Flow Diagram

Figure 11:
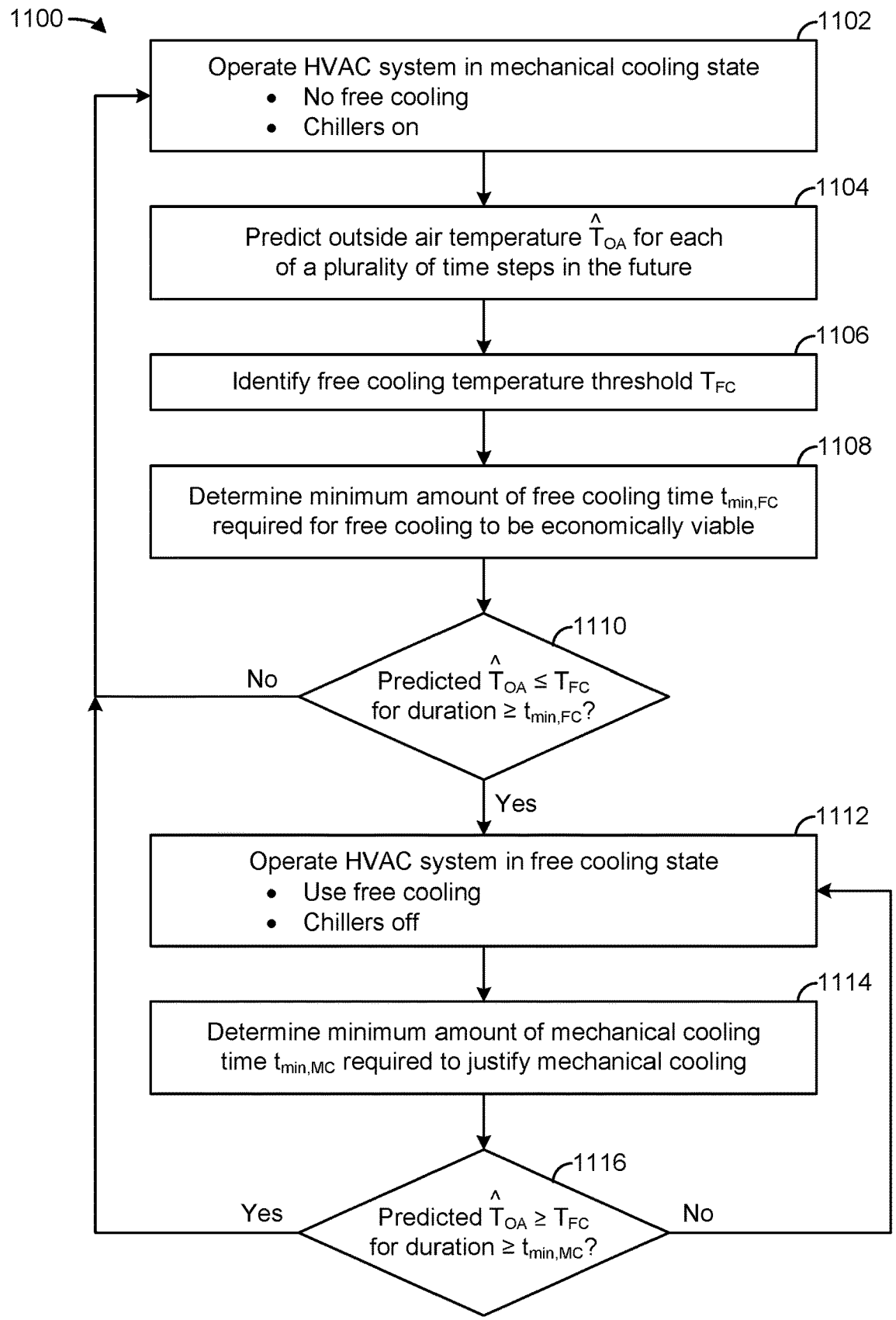
FIG. 11 is a flowchart of a process for operating the HVAC system of FIG. 6 in the mechanical cooling state and the free cooling state is shown, according to an exemplary embodiment.

Referring now to FIG. 11, a flow diagram of a process 1100 for operating a HVAC system in a mechanical cooling state and a free cooling state is shown, according to an exemplary embodiment. Process 1100 can be performed by one or more components of HVAC system 600, as described with reference to FIGS. 6-10. In some embodiments, process 1100 is performed by controller 640.

Process 1100 is shown to include operating the HVAC system in a mechanical cooling state (step 1102). In the mechanical cooling state (illustrated in FIG. 7), one or more chillers (e.g., chiller 610) can used to provide cooling for the chilled fluid in chilled fluid circuit 636. Both chilled fluid circuit 636 and cooling tower circuit 632 can be fluidly connected to chiller 610. Heat exchanger 606 may not be used and the fluid conduits connecting to heat exchanger 606 may be blocked. Free cooling may not be used in the mechanical cooling state.

In the mechanical cooling state, controller 640 may operate valve 624 to direct the cool water from cooling tower 602 through condenser 612. Condenser 612 transfers heat from the refrigerant in refrigeration circuit 634 to the cool water in cooling tower circuit 632, thereby warming the water. The warm water then flows from condenser 612 to valve 626. Controller 640 operates valve 626 to direct the warm water to cooling tower 602. Cooling tower 602 transfers heat from the water to cooler air flowing through cooling tower 602. Controller 640 can operate fan 604 to modulate the airflow through cooling tower 602, which adjusts the rate of heat transfer in cooling tower 602. Controller 640 can also operate pump 620 to modulate the flowrate of the water through cooling tower circuit 632, which adjusts the rate of heat transfer in cooling tower 602 and/or condenser 612.

In the mechanical cooling state, controller 640 may operate valve 630 to direct the fluid exiting cooling load 608 through evaporator 616. Evaporator 616 transfers heat from the fluid in chilled fluid circuit 636 to the refrigerant in refrigeration circuit 634, thereby chilling the fluid in chilled fluid circuit 636. The chilled fluid then flows from evaporator 616 to valve 628. Controller 640 operates valve 628 to direct the chilled fluid to cooling load 608. Cooling load 608 rejects heat to the chilled fluid, thereby providing cooling for cooling load 608 and warming the chilled fluid. Controller 640 can operate pump 622 to modulate the flowrate of the chilled fluid through chilled fluid circuit 636, which adjusts the rate of heat transfer in evaporator 616 and/or at cooling load 608.

Still referring to FIG. 11, process 1100 is shown to include predicting outside air temperature $\hat{T}_{OA}$ for each of a plurality of time steps in the future (step 1104). In some embodiments, the predicted outside air temperature $\hat{T}_{OA}$ is a wet bulb temperature of the air outside the building cooled by HVAC system 600. The outside air temperature $\hat{T}_{OA}$ can be predicted using measurements from sensors 914 and/or weather forecasts from weather service 916.

Process 1100 is shown to include identifying a free cooling temperature threshold $T_{FC}$ (step 1106). In some embodiments, the free cooling temperature threshold $T_{FC}$ is a maximum outside air wet bulb temperature at which free cooling is possible or economically viable. The free cooling temperature threshold $T_{FC}$ can be based on the temperature setpoint for the building or zone cooled by HVAC system 600. For example, the free cooling temperature threshold $T_{FC}$ may be approximately 40° F. for a building with a temperature setpoint around 70° F.

Process 1100 is shown to include determining a minimum amount of free cooling time $t_{min,FC}$ required for free cooling to be economically viable (step 1108). To make free cooling economically viable, the energy and cost savings achieved by free cooling should be sufficient to overcome the cost incurred as a result of transitioning between mechanical cooling state 1002 and free cooling state 1004. Step 1108 can include determining the minimum amount of time for which HVAC system 600 must continue to operate in free cooling state 1004 in order to offset the cost incurred as a result of the state transition.

In some embodiments, step 1108 includes calculating the minimum free cooling time $t_{min,FC}$. The minimum free cooling time $t_{min,FC}$ can be calculated by weighing the free cooling energy savings against the cost incurred as a result of switching from mechanical cooling state 1002 to free cooling state 1004. For example, step 1108 can include using the following equation to calculate the economic value of transitioning into free cooling state 1004 and operating in free cooling state 1004:

$$\text{Value}_{FC} = \Delta t_{FC} \text{Cost}_{elec} P_{elec} - \text{SwitchingPenalty}$$

where $\text{Value}_{FC}$ is the total economic value of transitioning into free cooling state 1004 and operating in free cooling state 1004 during the predicted free cooling period, $\Delta t_{FC}$ is the duration of the free cooling period (i.e., the predicted amount of time which will be spent in free cooling state 1004), $\text{Cost}_{elec}$ is the estimated per unit cost of electricity during the free cooling period $$\left(e.g., \frac{\$}{kWh}\right),$$

$P_{elec}$ is the estimated free cooling energy savings per unit time during the free cooling period (e.g., kW), and SwitchingPenalty is the economic or monetary cost (e.g., $) incurred as a result of switching from mechanical cooling state 1002 to free cooling state 1004.

In the previous equation, the term $\Delta t_{FC} \text{Cost}_{elec} P_{elec}$ represents the cost savings resulting from the use of free cooling relative to mechanical cooling over the duration of the free cooling period. For example, the product of energy cost $\text{Cost}_{elec}$ $$\left(e.g., \frac{\$}{kWh}\right)$$

and energy savings per unit time $P_{elec}$ (e.g., kW) represents the economic cost of electricity which is saved by the use of free cooling during each time step of the free cooling period $$\left(e.g., \frac{\$}{\text{hour}}\right).$$

Multiplying this savings per unit time by the duration of the free cooling period $\Delta t_{FC}$ (e.g., hours) results in the total cost savings over the duration of the free cooling period. The term SwitchingPenalty represents the economic cost incurred as a result of the state transition. As previously described, the economic cost may result from increased electricity consumption during chiller start-up or shut-down, increased equipment degradation resulting from switching chiller 610 on/off, inefficient chiller operation while chiller 610 is starting-up or shutting-down, electricity required to operate valves 624-630, and/or any other economic costs which are incurred as a result of the state transition.

Step 1108 can include calculating the minimum free cooling time $t_{min,FC}$ by finding the duration of the free cooling period $\Delta t_{FC}$ which results in a total economic value of zero (i.e., Value=0). For example, the minimum free cooling time $t_{min,FC}$ can be calculated using the following equation:

$$0 = t_{min,FC} \text{Cost}_{elec} P_{elec} - \text{SwitchingPenalty}$$

$$t_{min,FC} = \frac{\text{SwitchingPenalty}}{\text{Cost}_{elec} P_{elec}}$$

where the values of $\text{Cost}_{elec}$, $P_{elec}$, and SwitchingPenalty have known values. The value of SwitchingPenalty can be fixed, whereas the value of $\text{Cost}_{elec}$ can be received from an energy utility or predicted based past costs of electricity. The value of $P_{elec}$ can be predicted or estimated based on the amount of cooling required by cooling load 608.

Still referring to FIG. 11, process 1100 is shown to include determining whether the predicted outside air temperature $\hat{T}_{OA}$ will be less than or equal to the free cooling temperature threshold $T_{FC}$ for a duration greater than or equal to the minimum free cooling time $t_{min,FC}$ (step 1110). If the predicted outside air temperature $\hat{T}_{OA}$ will not remain below the temperature threshold $T_{FC}$ for at least the minimum free cooling time $t_{min,FC}$ (i.e., the result of step 1110 is "no"), process 1100 may return to step 1102 and continue to operate HVAC system 600 in the mechanical cooling state 1002. However, if the predicted outside air temperature $\hat{T}_{OA}$ will remain below the temperature threshold $T_{FC}$ for at least the minimum free cooling time $t_{min,FC}$ (i.e., the result of step 1110 is "yes"), process 1100 may proceed to step 1112.

Process 1100 is shown to include operating the HVAC system in a free cooling state (step 1112). In the free cooling state, heat exchanger 606 can be used to provide cooling for the chilled fluid in chilled fluid circuit 636. Both chilled fluid circuit 636 and cooling tower circuit 632 can be fluidly connected to heat exchanger 606. Chiller 610 may not be used in the free cooling state and the fluid conduits connecting to chiller 610 can be blocked.

In the free cooling state, controller 640 can operate valve 624 to direct the cool water from cooling tower 602 through heat exchanger 606. Heat exchanger 606 transfers heat from the fluid in chilled fluid circuit to the cool water in cooling tower circuit 632, thereby warming the water. The warm water then flows from heat exchanger 606 to valve 626. Controller 640 operates valve 626 to direct the warm water to cooling tower 602. Cooling tower 602 transfers heat from the water to cooler air flowing through cooling tower 602.

Controller 640 can operate fan 604 to increase or decrease the airflow through cooling tower 602, which increases or decreases the rate of heat transfer in cooling tower 602. Controller 640 can also operate pump 620 to modulate the flowrate of the water through cooling tower circuit 632, which adjusts the rate of heat transfer in cooling tower 602 and/or heat exchanger 606.

In the free cooling state, controller 640 can operate valve 630 to direct the fluid exiting cooling load 608 through heat exchanger 606. Heat exchanger 606 transfers heat from the fluid in chilled fluid circuit 636 to the water in cooling tower circuit 632, thereby chilling the fluid in chilled fluid circuit 636. The chilled fluid then flows from heat exchanger 606 to valve 628. Controller 640 operates valve 628 to direct the chilled fluid to cooling load 608. Cooling load 608 rejects heat to the chilled fluid, thereby providing cooling for cooling load 608 and warming the chilled fluid. Controller 640 can operate pump 622 to modulate the flowrate of the chilled fluid through chilled fluid circuit 636, which adjusts the rate of heat transfer in heat exchanger 606 and/or at cooling load 608.

Still referring to FIG. 11, process 1100 is shown to include determining a minimum amount of mechanical cooling time $t_{min,MC}$ required to justify mechanical cooling (step 1114) and determining whether the predicted outside air temperature $\hat{T}_{OA}$ will be greater than or equal to the free cooling temperature threshold $T_{FC}$ for a duration greater than or equal to the minimum mechanical cooling time $t_{min,MC}$ (step 1116). If the predicted outside air temperature $\hat{T}_{OA}$ will not remain above the temperature threshold $T_{FC}$ for at least the minimum mechanical cooling time $t_{min,MC}$ (i.e., the result of step 1116 is "no"), process 1100 may return to step 1112 and continue to operate HVAC system 600 in the free cooling state 1004. However, if the predicted outside air temperature $\hat{T}_{OA}$ will remain above the temperature threshold $T_{FC}$ for at least the minimum mechanical cooling time $t_{min,MC}$ (i.e., the result of step 1116 is "yes"), process 1100 may return to step 1102 and transition HVAC system into the mechanical cooling state 1002.

Central Plant System with Free Cooling

Figure 12:
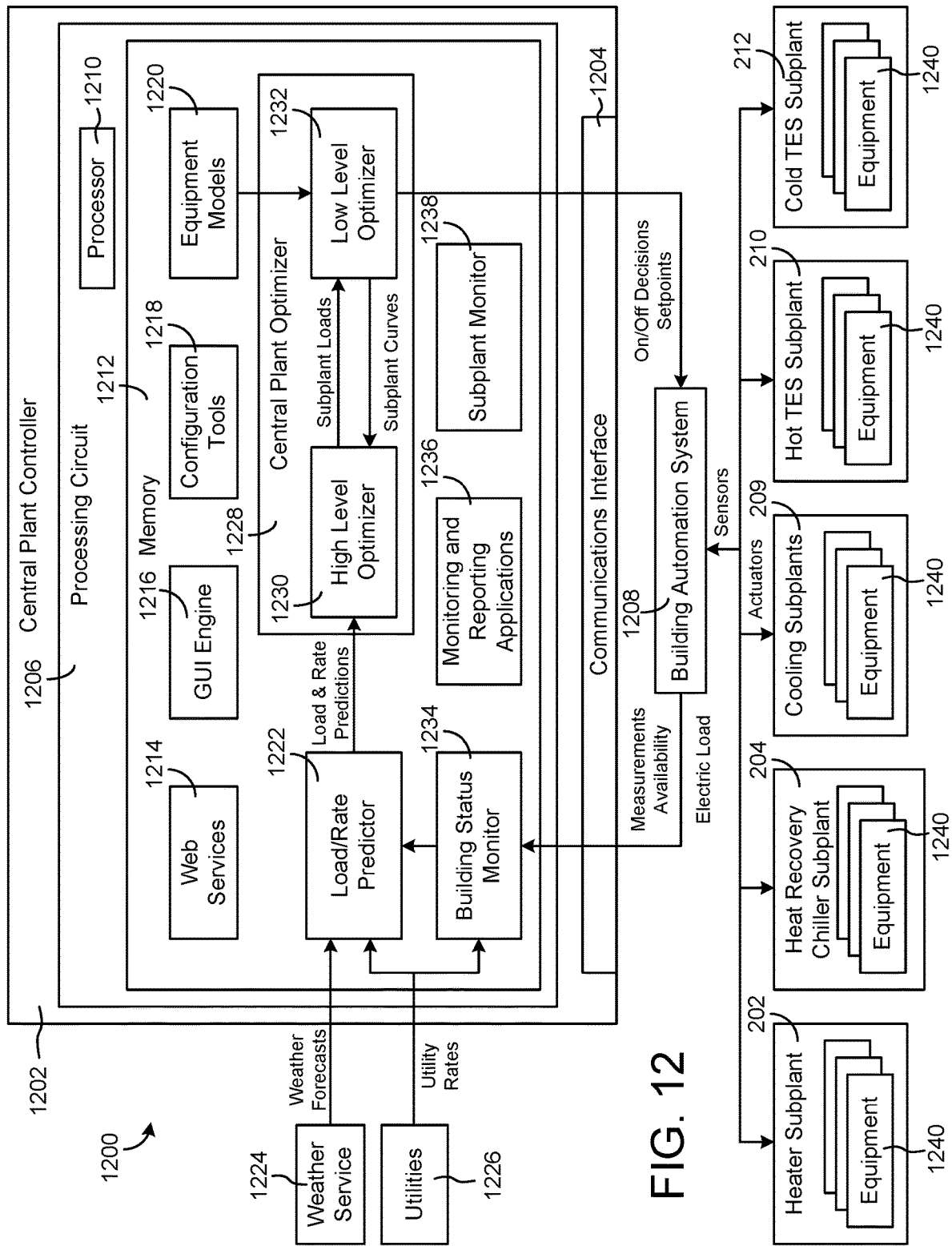
FIG. 12 is a block diagram of a central plant system with a central plant controller allocating thermal energy loads across multiple subplants, according to an exemplary embodiment.

Referring now to FIG. 12, a block diagram illustrating a central plant system 1200 is shown, according to an exemplary embodiment. System 1200 is shown to include a central plant controller 1202, a building automation system (BAS) 1208, and a plurality of subplants 202-212. Subplants 202-212 may be the same as previously described with reference to FIG. 2. For example, subplants 202-212 are shown to include a heater subplant 202, a heat recovery chiller subplant 204, cooling subplants 209 (e.g., chiller subplant 206 and cooling tower subplant 208), a hot TES subplant 210, and a cold TES subplant 212.

Each of subplants 202-212 is shown to include equipment 1240 that can be controlled by central plant controller 1202 and/or building automation system 1208 to optimize the performance of central plant 200. Equipment 1240 may include, for example, heating devices 220, chillers 232, heat recovery heat exchangers 226, cooling towers 238, thermal energy storage devices 242-244, pumps, valves, and/or other devices of subplants 202-212. Individual devices of equipment 1240 can be turned on or off to adjust the thermal energy load served by each of subplants 202-212. In some embodiments, individual devices of equipment 1240 can be operated at variable capacities (e.g., operating a chiller at 10% capacity or 60% capacity) according to an operating setpoint received from central plant controller 1202.

In some embodiments, one or more of subplants 202-212 includes a subplant level controller configured to control the equipment 1240 of the corresponding subplant. For example, central plant controller 1202 may determine an on/off configuration and global operating setpoints for equipment 1240. In response to the on/off configuration and received global operating setpoints, the subplant controllers may turn individual devices of equipment 1240 on or off, and implement specific operating setpoints (e.g., damper position, vane position, fan speed, pump speed, etc.) to reach or maintain the global operating setpoints.

In some embodiments, the subplant level controllers receive subplant load setpoints from central plant controller 1202. Each subplant level controller may use the subplant load setpoint for the corresponding subplant to select one or more devices of the equipment 1240 within the subplant to activate or deactivate in order to meet the subplant load setpoint in an energy-efficient manner. In other embodiments, the equipment selection and staging decisions (i.e., deciding which devices to turn on/off) are performed by a low level optimizer 1232 within central plant controller 1202.

Central plant system 1200 can be configured to use free cooling when economically feasible to optimize the cost of operating central plant 200. For example, system 1200 can switch from mechanical cooling to free cooling when current weather conditions or future weather forecasts indicate that free cooling is economically advantageous (e.g., less costly) relative to mechanical cooling. In some embodiments, central plant controller 1202 uses the techniques described with reference to FIGS. 6-10 to determine when to use free cooling. An example of a free cooling system which can be used by central plant system 1200 is described in greater detail with reference to FIG. 13.

BAS 1208 may be configured to monitor conditions within a controlled building or building zone. For example, BAS 1208 may receive input from various sensors (e.g., temperature sensors, humidity sensors, airflow sensors, voltage sensors, etc.) distributed throughout the building and may report building conditions to central plant controller 1202. Building conditions may include, for example, a temperature of the building or a zone of the building, a power consumption (e.g., electric load) of the building, a state of one or more actuators configured to affect a controlled state within the building, or other types of information relating to the controlled building. BAS 1208 may operate subplants 202-212 to affect the monitored conditions within the building and/or to serve the thermal energy loads of the building.

BAS 1208 may receive control signals from central plant controller 1202 specifying on/off states and/or setpoints for equipment 1240. BAS 1208 may control equipment 1240 (e.g., via actuators, power relays, etc.) in accordance with the control signals provided by central plant controller 1202. For example, BAS 1208 may operate equipment 1240 using closed loop control to achieve the setpoints specified by central plant controller 1202. In various embodiments, BAS 1208 may be combined with central plant controller 1202 or may be part of a separate building automation system. According to an exemplary embodiment, BAS 1208 is a METASYS® brand building automation system, as sold by Johnson Controls, Inc.

Central plant controller 1202 may monitor the status of the controlled building using information received from BAS 1208. Central plant controller 1202 may be configured to predict the thermal energy loads (e.g., heating loads, cooling loads, etc.) of the building for plurality of time steps in a prediction window (e.g., using weather forecasts from a weather service 1224). Central plant controller 1202 may generate on/off decisions and/or setpoints for equipment 1240 to minimize the cost of energy consumed by subplants 202-212 to serve the predicted heating and/or cooling loads for the duration of the prediction window. According to an exemplary embodiment, central plant controller 1202 is integrated within a single computer (e.g., one server, one housing, etc.). In various other exemplary embodiments, central plant controller 1202 can be distributed across multiple servers or computers (e.g., that can exist in distributed locations). In another exemplary embodiment, central plant controller 1202 is integrated with a smart building manager that manages multiple building systems and/or combined with BAS 1208.

Central plant controller 1202 is shown to include a communications interface 1204 and a processing circuit 1206. Communications interface 1204 may include wired or wireless interfaces (e.g., jacks, antennas, transmitters, receivers, transceivers, wire terminals, etc.) for conducting data communications with various systems, devices, or networks. For example, communications interface 1204 may include an Ethernet card and port for sending and receiving data via an Ethernet-based communications network and/or a WiFi transceiver for communicating via a wireless communications network. Communications interface 1204 may be configured to communicate via local area networks or wide area networks (e.g., the Internet, a building WAN, etc.) and may use a variety of communications protocols (e.g., BACnet, IP, LON, etc.).

Communications interface 1204 may be a network interface configured to facilitate electronic data communications between central plant controller 1202 and various external systems or devices (e.g., BAS 1208, subplants 202-212, etc.). For example, central plant controller 1202 may receive information from BAS 1208 indicating one or more measured states of the controlled building (e.g., temperature, humidity, electric loads, etc.) and one or more states of subplants 202-212 (e.g., equipment status, power consumption, equipment availability, etc.). Communications interface 1204 may receive inputs from BAS 1208 and/or subplants 202-212 and may provide operating parameters (e.g., on/off decisions, setpoints, etc.) to subplants 202-212 via BAS 1208. The operating parameters may cause subplants 202-212 to activate, deactivate, or adjust a setpoint for various devices of equipment 1240.

Still referring to FIG. 12, processing circuit 1206 is shown to include a processor 1210 and memory 1212. Processor 1210 may be a general purpose or specific purpose processor, an application specific integrated circuit (ASIC), one or more field programmable gate arrays (FPGAs), a group of processing components, or other suitable processing components. Processor 1210 may be configured to execute computer code or instructions stored in memory 1212 or received from other computer readable media (e.g., CDROM, network storage, a remote server, etc.).

Memory 1212 may include one or more devices (e.g., memory units, memory devices, storage devices, etc.) for storing data and/or computer code for completing and/or facilitating the various processes described in the present disclosure. Memory 1212 may include random access memory (RAM), read-only memory (ROM), hard drive storage, temporary storage, non-volatile memory, flash memory, optical memory, or any other suitable memory for storing software objects and/or computer instructions. Memory 1212 may include database components, object code components, script components, or any other type of information structure for supporting the various activities and information structures described in the present disclosure. Memory 1212 may be communicably connected to processor 1210 via processing circuit 1206 and may include computer code for executing (e.g., by processor 1210) one or more processes described herein.

Still referring to FIG. 12, memory 1212 is shown to include a building status monitor 1234. Central plant controller 1202 may receive data regarding the overall building or building space to be heated or cooled with central plant 200 via building status monitor 1234. In an exemplary embodiment, building status monitor 1234 may include a graphical user interface component configured to provide graphical user interfaces to a user for selecting building requirements (e.g., overall temperature parameters, selecting schedules for the building, selecting different temperature levels for different building zones, etc.).

Central plant controller 1202 may determine on/off configurations and operating setpoints to satisfy the building requirements received from building status monitor 1234. In some embodiments, building status monitor 1234 receives, collects, stores, and/or transmits cooling load requirements, building temperature setpoints, occupancy data, weather data, energy data, schedule data, and other building parameters. In some embodiments, building status monitor 1234 stores data regarding energy costs, such as pricing information available from utilities 1226 (energy charge, demand charge, etc.).

Still referring to FIG. 12, memory 1212 is shown to include a load/rate predictor 1222. Load/rate predictor 1222 may be configured to predict the thermal energy loads ($\hat{l}_k$) of the building or campus for each time step k (e.g., k=1 ... n) of an optimization period. Load/rate predictor 1222 is shown receiving weather forecasts from a weather service 1224. In some embodiments, load/rate predictor 1222 predicts the thermal energy loads $\hat{l}_k$ as a function of the weather forecasts. In some embodiments, load/rate predictor 1222 uses feedback from BAS 1208 to predict loads $\hat{l}_k$. Feedback from BAS 1208 may include various types of sensory inputs (e.g., temperature, flow, humidity, enthalpy, etc.) or other data relating to the controlled building (e.g., inputs from a HVAC system, a lighting control system, a security system, a water system, etc.).

In some embodiments, load/rate predictor 1222 receives a measured electric load and/or previous measured load data from BAS 1208 (e.g., via building status monitor 1234). Load/rate predictor 1222 may predict loads $\hat{l}_k$ as a function of a given weather forecast ($\hat{\phi}_w$), a day type (day), the time of day (t), and previous measured load data ($Y_{k-1}$). Such a relationship is expressed in the following equation:

$$\hat{l}_k = f(\hat{\phi}_w, \text{day}, t | Y_{k-1})$$

In some embodiments, load/rate predictor 1222 uses a deterministic plus stochastic model trained from historical load data to predict loads $\hat{l}_k$. Load/rate predictor 1222 may use any of a variety of prediction methods to predict loads $\hat{l}_k$ (e.g., linear regression for the deterministic portion and an AR model for the stochastic portion). Load/rate predictor 1222 may predict one or more different types of loads for the building or campus. For example, load/rate predictor 1222 may predict a hot water load $\hat{l}_{Hot,k}$ and a cold water load $\hat{l}_{Cold,k}$ for each time step k within the prediction window.

Load/rate predictor 1222 is shown receiving utility rates from utilities 1226. Utility rates may indicate a cost or price per unit of a resource (e.g., electricity, natural gas, water, etc.) provided by utilities 1226 at each time step k in the prediction window. In some embodiments, the utility rates are time-variable rates. For example, the price of electricity may be higher at certain times of day or days of the week (e.g., during high demand periods) and lower at other times of day or days of the week (e.g., during low demand periods). The utility rates may define various time periods and a cost per unit of a resource during each time period. Utility rates may be actual rates received from utilities 1226 or predicted utility rates estimated by load/rate predictor 1222.

In some embodiments, the utility rates include demand charges for one or more resources provided by utilities 1226. A demand charge may define a separate cost imposed by utilities 1226 based on the maximum usage of a particular resource (e.g., maximum energy consumption) during a demand charge period. The utility rates may define various demand charge periods and one or more demand charges associated with each demand charge period. In some instances, demand charge periods may overlap partially or completely with each other and/or with the prediction window. Advantageously, central plant optimizer 1228 may be configured to account for demand charges in the high level optimization process performed by high level optimizer 1230. Utilities 1226 may be defined by time-variable (e.g., hourly) prices, a maximum service level (e.g., a maximum rate of consumption allowed by the physical infrastructure or by contract) and, in the case of electricity, a demand charge or a charge for the peak rate of consumption within a certain period.

Load/rate predictor 1222 may store the predicted loads $\hat{l}_k$ and the utility rates in memory 1212 and/or provide the predicted loads $\hat{l}_k$ and the utility rates to central plant optimizer 1228. Central plant optimizer 1228 may use the predicted loads $\hat{l}_k$ and the utility rates to determine an optimal load distribution for subplants 202-212 and to generate on/off decisions and setpoints for equipment 1240.

Still referring to FIG. 12, memory 1212 is shown to include an central plant optimizer 1228. Central plant optimizer 1228 may perform a cascaded optimization process to optimize the performance of central plant 200. For example, central plant optimizer 1228 is shown to include a high level optimizer 1230 and a low level optimizer 1232. High level optimizer 1230 may control an outer (e.g., subplant level) loop of the cascaded optimization. High level optimizer 1230 may determine an optimal distribution of thermal energy loads across subplants 202-212 for each time step in the prediction window in order to optimize (e.g., minimize) the cost of energy consumed by subplants 202-212. Low level optimizer 1232 may control an inner (e.g., equipment level) loop of the cascaded optimization. Low level optimizer 1232 may determine how to best run each subplant at the load setpoint determined by high level optimizer 1230. For example, low level optimizer 1232 may determine on/off states and/or operating setpoints for various devices of equipment 1240 in order to optimize (e.g., minimize) the energy consumption of each subplant while meeting the thermal energy load setpoint for the subplant. The cascaded optimization process is described in greater detail with reference to FIG. 4.

Still referring to FIG. 12, memory 1212 is shown to include a subplant monitor 1238. Subplant monitor 1238 may collect and store information regarding the past, current, and future (e.g., planned) utilization of subplants 202-212. For example, subplant monitor 1238 may receive actual utilization data from BAS 1208 and/or central plant 200 indicating the actual thermal energy loads served by heater subplant 202, heat recovery chiller subplant 204, and chiller subplant 206. The actual utilization data may be current utilization data (e.g., the actual thermal energy loads currently being served) or past utilization data (e.g., the actual thermal energy loads served at a previous time). The actual utilization data may also indicate the past or current charging or discharging rates for hot TES subplant 210 and cold TES subplant 212 and the past or current status (i.e., storage level) of TES subplants 210-212. In some embodiments, the actual utilization data indicates a total heating load and/or a total cooling load requested to be served by central plant 200 at a past or current time. The actual utilization data may also indicate any unmet heating and/or cooling load that is requested but not met by central plant 200 at a past or current time. In some embodiments, the actual utilization data indicates a past or current rate of utility consumption (e.g., water consumption, electricity consumption, natural gas consumption, photovoltaic energy consumption, etc.).

The actual utilization data may be provided at various levels of granularity. For example, the actual utilization data for a given subplant (e.g., chiller subplant 206) may include an aggregate value that represents the total thermal energy load served by the subplant (e.g., the total load served by all of chillers 232). In other embodiments, the actual utilization data may be provided for each of the individual devices within subplants 202-212 (e.g., the cooling load served by each of chillers 232 individually).

In some embodiments, subplant monitor 1238 receives the actual utilization data as a continuous data signal. In other embodiments, subplant monitor 1238 receives the actual utilization data at regular intervals (e.g., every minute, every fifteen minutes, every hour, etc.). Subplant monitor 1238 may store the actual utilization data in memory 1212 or in a separate subplant utilization database. In some embodiments, subplant monitor 1238 stores the actual utilization data at regular intervals such that the stored utilization data represents a history of the relevant operating information for central plant 200 over time.

Subplant monitor 1238 may receive predicted future utilization data indicating the thermal energy loads to be served by heater subplant 202, heat recovery chiller subplant 204, and chiller subplant 206 at a future time. The predicted utilization data may also indicate the predicted charging or discharging rates for hot TES subplant 210 and cold TES subplant 212 and the predicted status (i.e., storage level) of TES subplants 210-212 at a future time. In some embodiments, the predicted utilization data for subplants 202-212 is generated by central plant optimizer 1228 for multiple time steps during a prediction window. For example, the predicted utilization data may include the optimal subplant loads predicted by high level optimizer 1230 and/or the optimal equipment on/off states predicted by low level optimizer 1232 for each time step during the prediction window.

In some embodiments, the predicted utilization data indicates a total heating load and/or a total cooling load predicted by load/rate predictor 1222. The predicted utilization data may also indicate any unmet heating and/or cooling load that is predicted to be requested but not met by central plant 200. In some embodiments, the predicted utilization data indicates a predicted rate of utility consumption (e.g., water consumption, electricity consumption, natural gas consumption, photovoltaic energy consumption, etc.).

The predicted utilization data may be provided at various levels of granularity. For example, the predicted utilization data for a given subplant (e.g., chiller subplant 206) may include an aggregate value that represents the total thermal energy load estimated to be served by the subplant (e.g., the total predicted load served by all of chillers 232). In other embodiments, the predicted utilization data may be provided for each of the individual devices within subplants 202-212 (e.g., the predicted cooling load served by each of chillers 232 individually).

In some embodiments, subplant monitor 1238 receives the predicted utilization data for each of a plurality of time steps during a prediction window. For example, central plant optimizer 1228 may perform an optimization process (described in greater detail with reference to FIG. 4) to generate subplant load values for each time step during a prediction window that extends from the current time to a predetermined prediction horizon. Each time step may have a defined duration (e.g., fifteen minutes, one hour, etc.). The predicted subplant load values may be updated each time the optimization process is performed. Subplant monitor 1238 may store the predicted utilization data in memory 1212 or in a separate subplant utilization database. In some embodiments, subplant monitor 1238 stores the predicted utilization data at regular intervals (e.g., hourly intervals) such that the stored utilization data represents a planned dispatch schedule for central plant 200 over time.

Data and processing results from central plant optimizer 1228, subplant monitor 1238, or other modules of central plant controller 1202 may be accessed by (or pushed to) monitoring and reporting applications 1236. Monitoring and reporting applications 1236 may be configured to generate real time system health dashboards that can be viewed and navigated by a user (e.g., a central plant engineer). For example, monitoring and reporting applications 1236 may include a web-based monitoring application with several graphical user interface (GUI) elements (e.g., widgets, dashboard controls, windows, etc.) for displaying key performance indicators (KPI) or other information to users of a GUI. In some embodiments, the GUI elements include a chart or graph (e.g., a dispatch bar chart) that represents the actual and predicted utilization data provided by subplant monitor 1238. GUI elements or reports may be generated and shown based on actual and predicted utilization data that allow users to monitor the performance of subplants 202-212 and central plant 200 as a whole using a single screen.

Still referring to FIG. 12, central plant controller 1202 may include one or more GUI servers, web services 1214, or GUI engines 1216 to support monitoring and reporting applications 1236. In various embodiments, applications 1236, web services 1214, and GUI engine 1216 may be provided as separate components outside of central plant controller 1202 (e.g., as part of a smart building manager). Central plant controller 1202 may be configured to maintain detailed historical databases (e.g., relational databases, XML databases, etc.) of relevant data and includes computer code modules that continuously, frequently, or infrequently query, aggregate, transform, search, or otherwise process the data maintained in the detailed databases. Central plant controller 1202 may be configured to provide the results of any such processing to other databases, tables, XML files, or other data structures for further querying, calculation, or access by, for example, external monitoring and reporting applications.

Central plant controller 1202 is shown to include configuration tools 1218. Configuration tools 1218 can allow a user to define (e.g., via graphical user interfaces, via prompt-driven wizards, etc.) how central plant controller 1202 should react to changing conditions in the central plant subsystems. In an exemplary embodiment, configuration tools 1218 allow a user to build and store condition-response scenarios that can cross multiple central plant devices, multiple building systems, and multiple enterprise control applications (e.g., work order management system applications, entity resource planning applications, etc.). For example, configuration tools 1218 can provide the user with the ability to combine data (e.g., from subsystems, from event histories) using a variety of conditional logic. In varying exemplary embodiments, the conditional logic can range from simple logical operators between conditions (e.g., AND, OR, XOR, etc.) to pseudo-code constructs or complex programming language functions (allowing for more complex interactions, conditional statements, loops, etc.). Configuration tools 1218 can present user interfaces for building such conditional logic. The user interfaces may allow users to define policies and responses graphically. In some embodiments, the user interfaces may allow a user to select a pre-stored or pre-constructed policy and adapt it or enable it for use with their system.

In some embodiments, central plant optimizer 1228 is configured to perform a cascaded optimization process to optimize the performance of central plant 200. In the cascaded optimization process, high level optimizer 1230 performs a subplant level optimization that determines an optimal distribution of thermal energy loads across subplants 202-212 for each time step in the prediction window in order to minimize the cost of energy consumed by subplants 202-212. Low level optimizer 1232 performs an equipment level optimization that determines how to best run each subplant at the subplant load setpoint determined by high level optimizer 1230. For example, low level optimizer 1232 may determine on/off states and/or operating setpoints for various devices of equipment 1240 in order to optimize the energy consumption of each subplant while meeting the thermal energy load setpoint for the subplant.

One advantage of the cascaded optimization process performed by central plant optimizer 1228 is the optimal use of computational time. For example, the subplant level optimization performed by high level optimizer 1230 may use a relatively long time horizon due to the operation of the thermal energy storage. However, the equipment level optimization performed by low level optimizer 1232 may use a much shorter time horizon or no time horizon at all since the low level system dynamics are relatively fast (compared to the dynamics of the thermal energy storage) and the low level control of equipment 1240 may be handled by BAS 1208. Such an optimal use of computational time makes it possible for central plant optimizer 1228 to perform the central plant optimization in a short amount of time, allowing for real-time predictive control. For example, the short computational time enables central plant optimizer 1228 to be implemented in a real-time planning tool with interactive feedback.

Another advantage of the cascaded optimization performed by central plant optimizer 1228 is that the central plant optimization problem can be split into two cascaded subproblems. The cascaded configuration provides a layer of abstraction that allows high level optimizer 1230 to distribute the thermal energy loads across subplants 202-212 without requiring high level optimizer 1230 to know or use any details regarding the particular equipment configuration within each subplant. The interconnections between equipment 1240 within each subplant may be hidden from high level optimizer 1230 and handled by low level optimizer 1232. For purposes of the subplant level optimization performed by high level optimizer 1230, each subplant may be completely defined by one or more subplant curves 1242.

Low level optimizer 1232 may generate and provide subplant curves 1242 to high level optimizer 1230. Subplant curves 1242 may indicate the rate of utility use by each of subplants 202-212 (e.g., electricity use measured in kW, water use measured in L/s, etc.) as a function of the subplant load. In some embodiments, low level optimizer 1232 generates subplant curves 1242 based on equipment models 1220 (e.g., by combining equipment models 1220 for individual devices into an aggregate curve for the subplant). Low level optimizer 1232 may generate subplant curves 1242 by running the low level optimization process for several different loads and weather conditions to generate multiple data points. Low level optimizer 1232 may fit a curve to the data points to generate subplant curves 1242. In other embodiments, low level optimizer 1232 provides the data points to high level optimizer 1230 and high level optimizer 1230 generates the subplant curves using the data points.

High level optimizer 1230 may receive the load and rate predictions from load/rate predictor 1222 and the subplant curves 1242 from low level optimizer 1232. The load predictions may be based on weather forecasts from weather service 1224 and/or information from building automation system 1208 (e.g., a current electric load of the building, measurements from the building, a history of previous loads, a setpoint trajectory, etc.). The utility rate predictions may be based on utility rates received from utilities 1226 and/or utility prices from another data source. High level optimizer 1230 may determine the optimal load distribution for subplants 202-212 (e.g., a subplant load for each subplant) for each time step the prediction window and may provide the subplant loads as setpoints to low level optimizer 1232. In some embodiments, high level optimizer 1230 determines the subplant loads by minimizing the total operating cost of central plant 200 over the prediction window. In other words, given a predicted load and utility rate information from load/rate predictor 1222, high level optimizer 1230 may distribute the predicted load across subplants 202-212 over the optimization period to minimize operating cost.

In some instances, the optimal load distribution may include using TES subplants 210 and/or 212 to store thermal energy during a first time step for use during a later time step. Thermal energy storage may advantageously allow thermal energy to be produced and stored during a first time period when energy prices are relatively low and subsequently retrieved and used during a second time period when energy proves are relatively high. The high level optimization may be different from the low level optimization in that the high level optimization has a longer time constant due to the thermal energy storage provided by TES subplants 210-212. The high level optimization may be described by the following equation:

$$\theta^*_{HL} = \underset{\theta_{HL}}{\text{argmin}} J_{HL}(\theta_{HL})$$

where $\theta^*_{HL}$ contains the optimal high level decisions (e.g., the optimal load for each of subplants 202-212) for the entire optimization period and $J_{HL}$ is the high level cost function.

To find the optimal high level decisions $\theta^*_{HL}$, high level optimizer 1230 may minimize the high level cost function $J_{HL}$. The high level cost function $J_{HL}$ may be the sum of the economic (e.g., monetary) costs of each utility consumed by each of subplants 202-212 for the duration of the optimization period. In some embodiments, the high level cost function $J_{HL}$ may be described using the following equation:

$$J_{HL}(\theta_{HL}) = \sum_{k=1}^{n_h} \sum_{i=1}^{n_s} \left[ \sum_{j=1}^{n_u} t_s \cdot c_{jk} u_{jik}(\theta_{HL}) \right]$$

where $n_h$ is the number of time steps k in the optimization period, $n_s$ is the number of subplants, $t_s$ is the duration of a time step, $c_{jk}$ is the economic cost of utility j at a time step k of the optimization period, and $u_{jik}$ is the rate of use of utility j by subplant i at time step k.

In some embodiments, the cost function $J_{HL}$ includes an additional demand charge term such as:

$$w_d c_{demand} \max_{n_h}(u_{elec}(\theta_{HL}), u_{max,ele})$$

where $w_d$ is a weighting term, $c_{demand}$ is the demand cost, and the max( ) term selects the peak electricity use during the applicable demand charge period. Accordingly, the high level cost function $J_{HL}$ may be described by the equation:

$$J_{HL}(\theta_{HL}) = \sum_{k=1}^{n_h} \sum_{i=1}^{n_s} \left[ \sum_{j=1}^{n_u} t_s \cdot c_{jk} u_{jik}(\theta_{HL}) \right] + w_d c_{demand} \max_{n_h}(u_{elec}(\theta_{HL}), u_{max,ele})$$

The decision vector $\theta_{HL}$ may be subject to several constraints. For example, the constraints may require that the subplants not operate at more than their total capacity, that the thermal storage not charge or discharge too quickly or under/over flow for the tank, and that the thermal energy loads for the building or campus are met. These restrictions may lead to both equality and inequality constraints on the high level optimization problem.

In some embodiments, the high level optimization performed by high level optimizer 1230 is the same or similar to the high level optimization process described in U.S. patent application Ser. No. 14/634,609 filed Feb. 27, 2015 and titled "High Level Central Plant Optimization," the entire disclosure of which is incorporated by reference herein. High level optimizer 1230 may include some or all of the features and/or functionality of the high level optimization module described in U.S. patent application Ser. No. 14/634,609.

Low level optimizer 1232 may use the subplant loads determined by high level optimizer 1230 to determine optimal low level decisions $\theta^*_{LL}$ (e.g. binary on/off decisions, flow setpoints, temperature setpoints, etc.) for equipment 1240. The low level optimization process may be performed for each of subplants 202-212. In various embodiments, the low level optimization process may be performed by centralized low level optimizer 1232 that performs a separate low level optimization for each of subplants 202-212 or by a set of subplant level controllers that operate within each subplant (e.g., each subplant controller running an instance of low level optimizer 1232). Low level optimizer 1232 may be responsible for determining which devices of the subplant to use and/or the operating setpoints for such devices that will achieve the subplant load setpoint while minimizing energy consumption. The low level optimization may be described using the following equation:

$$\theta_{LL}^* = \underset{\theta_{LL}}{\operatorname{argmin}} J_{LL}(\theta_{LL})$$

where $\theta^*_{LL}$ contains the optimal low level decisions and $J_{LL}$ is the low level cost function.

To find the optimal low level decisions $\theta^*_{LL}$, low level optimizer 1232 may minimize the low level cost function $J_{LL}$. The low level cost function $J_{LL}$ may represent the total energy consumption for all of equipment 1240 in the applicable subplant. The low level cost function $J_{LL}$ may be described using the following equation:

$$J_{LL}(\theta_{LL}) = \sum_{j=1}^{N} t_s \cdot b_j \cdot u_j(\theta_{LL})$$

where N is the number of devices of equipment 1240 in the subplant, $t_s$ is the duration of a time step, $b_j$ is a binary on/off decision (e.g., 0=off, 1=on), and $u_j$ is the energy used by device j as a function of the setpoint $\theta_{LL}$. Each device may have continuous variables which can be changed to determine the lowest possible energy consumption for the overall input conditions.

Low level optimizer 1232 may minimize the low level cost function $J_{LL}$ subject to inequality constraints based on the capacities of equipment 1240 and equality constraints based on energy and mass balances. In some embodiments, the optimal low level decisions $\theta^*_{LL}$ are constrained by switching constraints defining a short horizon for maintaining a device in an on or off state after a binary on/off switch. The switching constraints may prevent devices from being rapidly cycled on and off. In some embodiments, low level optimizer 1232 performs the equipment level optimization without considering system dynamics. The optimization process may be slow enough to safely assume that the equipment control has reached its steady-state. Thus, low level optimizer 1232 may determine the optimal low level decisions $\theta^*_{LL}$ at an instance of time rather than over a long horizon.

Low level optimizer 1232 may determine optimum operating statuses (e.g., on or off) for a plurality of devices of equipment 1240. According to an exemplary embodiment, the on/off combinations may be determined using binary optimization and quadratic compensation. Binary optimization may minimize a cost function representing the power consumption of devices in the applicable subplant. In some embodiments, non-exhaustive (i.e., not all potential combinations of devices are considered) binary optimization is used. Quadratic compensation may be used in considering devices whose power consumption is quadratic (and not linear). Low level optimizer 1232 may also determine optimum operating setpoints for equipment using nonlinear optimization. Nonlinear optimization may identify operating setpoints that further minimize the low level cost function $J_{LL}$. Low level optimizer 1232 may provide the on/off decisions and setpoints to building automation system 1208 for use in controlling the central plant equipment 1240.

In some embodiments, the low level optimization performed by low level optimizer 1232 is the same or similar to the low level optimization process described in U.S. patent application Ser. No. 14/634,615 filed Feb. 27, 2015 and titled "Low Level Central Plant Optimization," the entire disclosure of which is incorporated by reference herein. Low level optimizer 1232 may include some or all of the features and/or functionality of the low level optimization module described in U.S. patent application Ser. No. 14/634,615.

Free Cooling System

Figure 13:
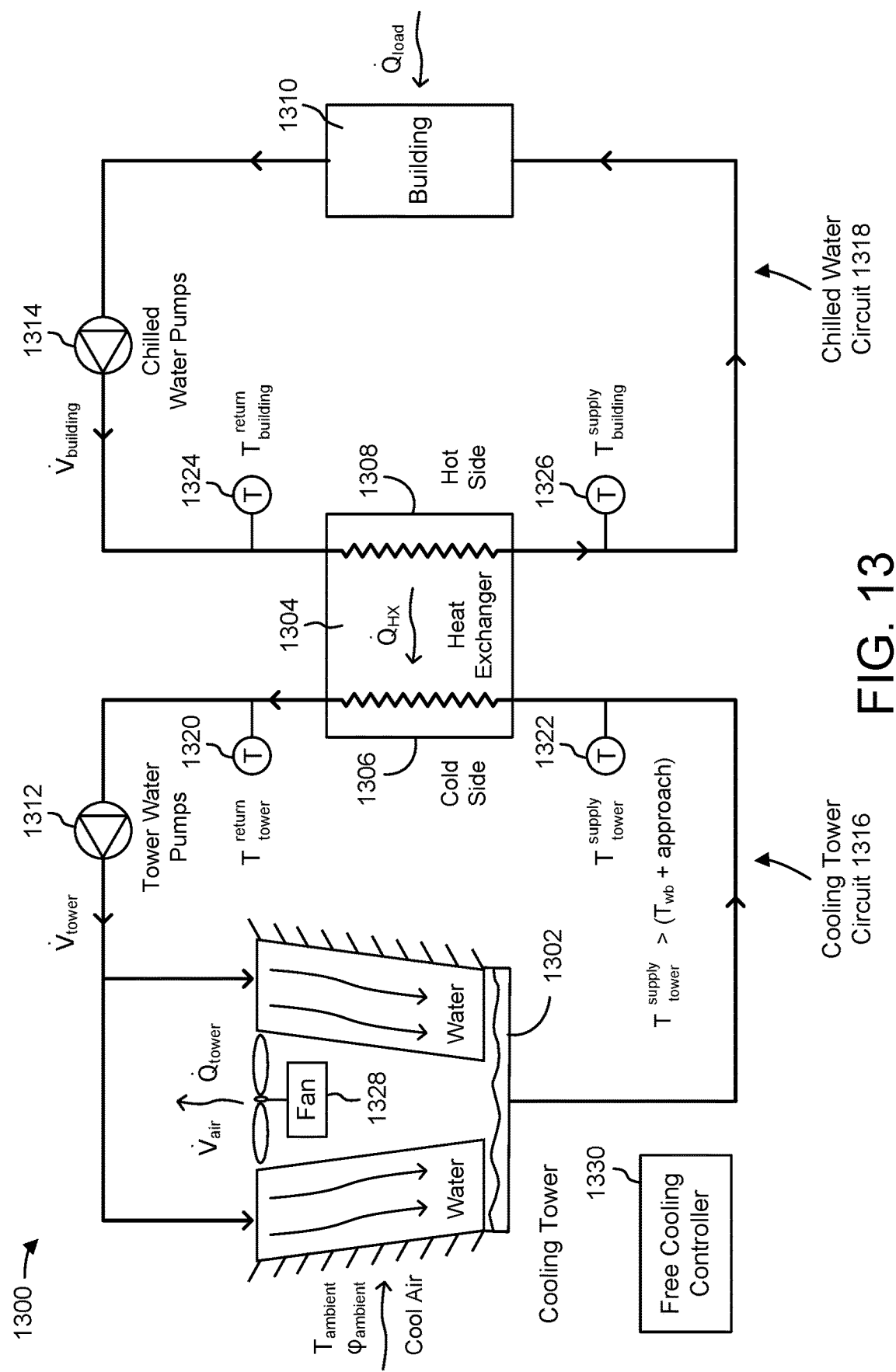
FIG. 13 is a block diagram of a free cooling system including a chilled water circuit which removes heat from a building and a cooling tower circuit which uses free cooling and a cooling tower to remove heat from the chilled water circuit, according to an exemplary embodiment.

Referring now to FIG. 13, a free cooling system 1300 is shown, according to an exemplary embodiment. Free cooling system 1300 can be implemented as a standalone system or as a component of one or more of the systems previously described. For example, free cooling system 1300 can be implemented in central plant 200 and/or central plant system 1200 (e.g., as a free cooling subplant) to cool the chilled water provided to the building. In other embodiments, free cooling system 1300 can be implemented as a component of HVAC system 600 to provide cooling for cooling load 608.

Free cooling system 1300 is shown to include a cooling tower circuit 1316 and a chilled water circuit 1318 connected by a heat exchanger 1304. Cooling tower circuit 1316 is shown to include a cooling tower 1302 and tower water pumps 1312. Tower water pumps 1312 can include one or more fluid pumps configured to circulate water (or any other coolant) between cooling tower 1302 and a cold side 1306 of heat exchanger 1304. Although cooling tower circuit 1316 is shown and described as circulating water, it should be understood that any type of coolant or working fluid (e.g., water, glycol, $CO_2$, etc.) can be used in cooling tower circuit 1316.

In operation, the cooling tower water (i.e., the water in cooling tower circuit 1316) enters heat exchanger 1304 at a temperature of $T_{tower}^{supply}$ (° C.). The temperature $T_{tower}^{supply}$ can be measured by a temperature sensor 1322 located along cooling tower circuit 1316 between cooling tower 1302 and heat exchanger 1304 (e.g., at the inlet of cold side 1306). Heat exchanger 1304 is configured to transfer heat from hot side 1308 to cold side 1306 (i.e., from chilled water circuit 1318 to cooling tower circuit 1316) at a rate of $\dot{Q}_{HX}$ (kW). The cooling tower water absorbs heat in heat exchanger 1304 and exits heat exchanger 1304 at a temperature of $T_{tower}^{return}$ (° C.). The temperature $T_{tower}^{return}$ can be measured by a temperature sensor 1320 located along cooling tower circuit 1316 between heat exchanger 1304 and cooling tower 1302 (e.g., at the outlet of cold side 1306). The cooling tower water rejects heat in cooling tower 1302 (e.g., by transferring heat to cool air flowing through cooling tower 1302) at a rate of $\dot{Q}_{tower}$ (kW). The cool air enters cooling tower 1302 at a dry bulb temperature of $T_{ambient}$ and a humidity of $\varphi_{ambient}$.

Tower water pumps 1312 can be operated by a free cooling controller 1330 to circulate the cooling tower water at a controllable flowrate $\dot{V}_{tower}$ (m³/s) through heat exchanger 1304 and cooling tower 1302. Controller 1330 can modulate the flowrate $\dot{V}_{tower}$ by increasing or decreasing the speed of tower water pumps 1312. By modulating the flowrate $\dot{V}_{tower}$, controller 1330 can adjust the rate of heat transfer $\dot{Q}_{HX}$ in heat exchanger 1304 and the rate of heat transfer $\dot{Q}_{tower}$ in cooling tower 1302. Similarly, controller 1330 can modulate the flowrate $\dot{V}_{air}$ of cool air through cooling tower 1302 by increasing or decreasing the speed of cooling tower fan 1328. By modulating the speed of fan 1328 and airflow rate $\dot{V}_{air}$, controller 1330 can adjust the rate of heat transfer $\dot{Q}_{tower}$ in cooling tower 1302. By adjusting the rates of heat transfer $\dot{Q}_{HX}$ and $\dot{Q}_{tower}$, controller 1330 can control the temperatures $T_{tower}^{supply}$ and $T_{tower}^{return}$. The operation of controller 1330 is described in greater detail with reference to FIG. 14.

Still referring to FIG. 13, chilled water circuit 1318 is shown to include a building 1310 and chilled water pumps 1314. Building 1310 has a thermal energy load of $\dot{Q}_{load}$ (kW), which must be removed from building 1310 in order to maintain building 1310 at a comfortable temperature. Chilled water pumps 1314 can include one or more fluid pumps configured to circulate water (or any other coolant) between building 1310 and a hot side 1308 of heat exchanger 1304. Although chilled water circuit 1318 is shown and described as circulating water, it should be understood that any type of coolant or working fluid (e.g., water, glycol, CO2, etc.) can be used in chilled water circuit 1318.

In operation, the chilled water (i.e., the water in chilled water circuit 1318) enters heat exchanger 1304 at a temperature of $T_{building}^{return}$(° C.). The temperature $T_{building}^{return}$ can be measured by a temperature sensor 1324 located along chilled water circuit 1318 between building 1310 and heat exchanger 1304 (e.g., at the inlet of hot side 1308). The chilled water rejects heat in heat exchanger 1304 at a rate of $\dot{Q}_{HX}$ and exits heat exchanger 1304 at a temperature of $T_{building}^{supply}$(° C.). The temperature $T_{building}^{supply}$ can be measured by a temperature sensor 1326 located along chilled water circuit 1318 between heat exchanger 1304 and building 1310 (e.g., at the outlet of hot side 1308). The chilled water absorbs heat in building 1310 at a rate of $\dot{Q}_{load}$ to provide cooling for building 1310. In order to maintain chilled water circuit 1318 at steady state, the rate of heat transfer into chilled water circuit 1318 (i.e., $\dot{Q}_{load}$) and the rate of heat transfer out of chilled water circuit 1318 (i.e., $\dot{Q}_{HX}$) may be equal (i.e., $\dot{Q}_{load} - \dot{Q}_{HX} = 0$).

Chilled water pumps 1314 can be operated by a controller 1330 to circulate the chilled water at a controllable flowrate $\dot{V}_{building}$ (m³/s) through heat exchanger 1304 and building 1310. Controller 1330 can modulate the flowrate $\dot{V}_{building}$ by increasing or decreasing the speed of chilled water pumps 1314. By modulating the flowrate $\dot{V}_{building}$, controller 1330 can adjust the rate of heat transfer $\dot{Q}_{HX}$ in heat exchanger 1304 and the rate of heat transfer $\dot{Q}_{load}$ in building 1310. By adjusting the rate of heat transfer $\dot{Q}_{HX}$ in heat exchanger 1304, controller 1330 can control the temperatures $T_{building}^{supply}$ and $T_{building}^{return}$.

Free Cooling Controller

Figure 14:
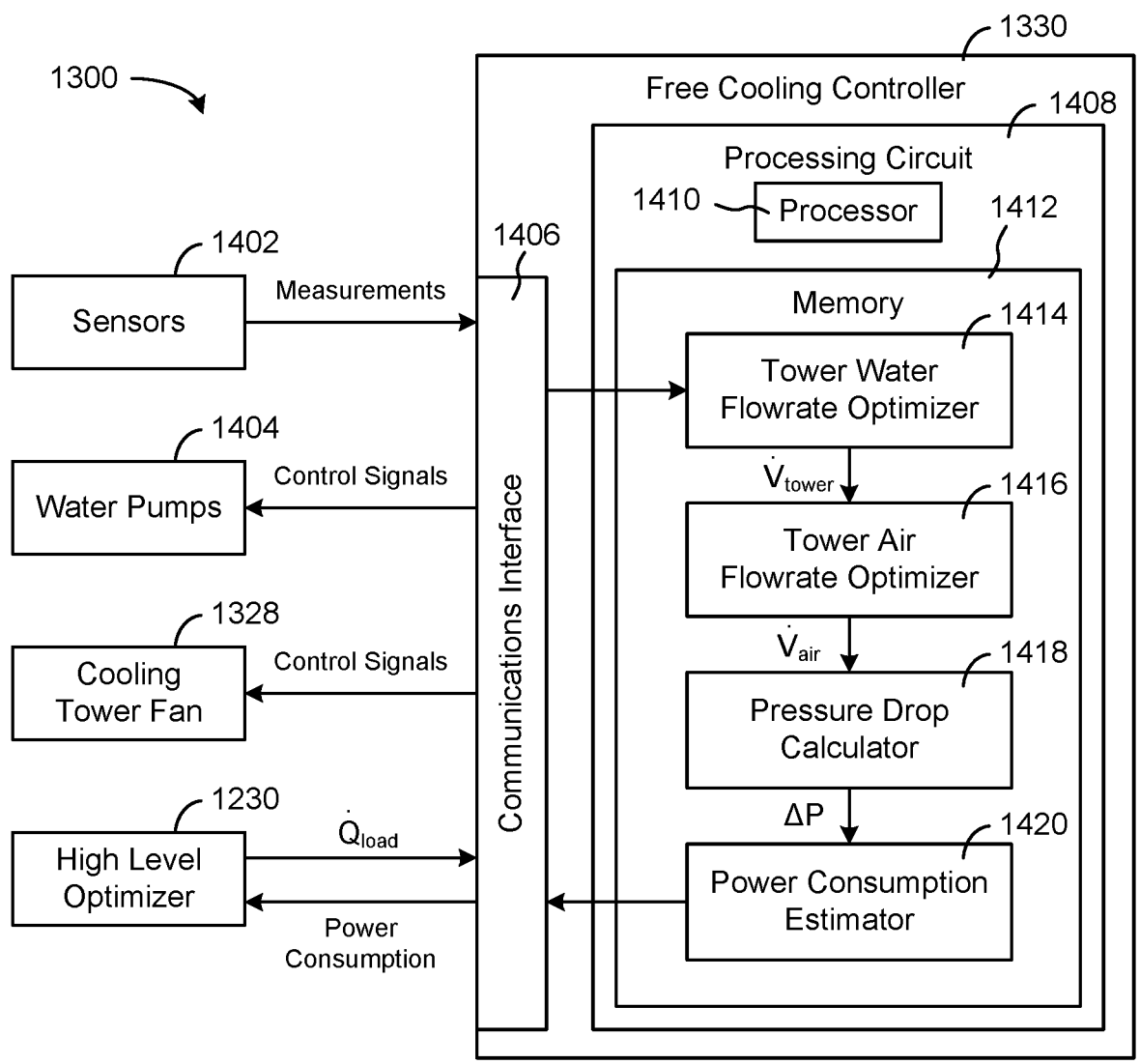
FIG. 14 is a block diagram of a free cooling controller which can be used to monitor and control the free cooling system of FIG. 13, according to an exemplary embodiment.

Referring now to FIG. 14, a block diagram illustrating free cooling controller 1330 in greater detail is shown, according to an exemplary embodiment. Free cooling controller 1330 can be configured to estimate the power consumption of free cooling system 1300 required satisfy the cooling load $\dot{Q}_{load}$ of building 1310. In some embodiments, the required cooling load $\dot{Q}_{load}$ is determined by high level optimizer 1230 using the high level optimization process described with reference to FIG. 12. For example, high level optimizer 1230 can assign the cooling load $\dot{Q}_{load}$ to free cooling system 1300 and controller 1330 can determine the minimum power consumption required to satisfy the cooling load $\dot{Q}_{load}$. Controller 1330 can provide the estimated power consumption as an output to high level optimizer 1230.

Free cooling controller 1330 is shown receiving measurements from sensors 1402. Sensors 1402 can include any type of sensor or measurement device in free cooling system 1300. For example, sensors 1402 can include temperature sensors 1320-1326 configured to measure $T_{tower}^{supply}$, $T_{tower}^{return}$, $T_{building}^{supply}$, and $T_{building}^{return}$. Sensors 1402 can include flowrate sensors configured to measure the cooling tower water flowrate $\dot{V}_{tower}$ in cooling tower circuit 1316, the chilled water flowrate $\dot{V}_{building}$ in chilled water circuit 1318, and/or the air flowrate $\dot{V}_{air}$ through cooling tower 1302. Sensors 1402 can include outside air sensors configured to measure the temperature $T_{ambient}$ and humidity $\varphi_{ambient}$ of the outside air flowing into cooling tower 1302.

In some embodiments, the ambient air conditions are provided by a weather service (e.g., weather service 916) rather than measured by sensors 1402.

In some embodiments, practical temperatures of $T_{tower}^{supply}$ are about 42° F. to 45° F. (5.6° C. to 7.2° C.). $T_{tower}^{supply}$ may be at least 7° F. (3.9° C.) above $T_{wb}$, the wet bulb temperature. This heuristic implies a required wet-bulb temperature of (at most) 35° F. to 38° F. (1.7° C. to 3.3° C.). A typical value of $T_{building}^{supply}$ during the winter months is about 50° F. (10° C.), and for $T_{building}^{return}$ is about 55° F. (12.8° C.). The drier the air, the higher the ambient dry-bulb temperature can be when using free cooling. Sometimes, $T_{building}^{supply}$ can even be as high as 55° F. in winter months.

Free cooling controller 1330 is shown providing control signals to water pumps 1404 and cooling tower fan 1328. Water pumps 1404 can include tower water pumps 1312 and chilled water pumps 1314. In some embodiments, the control signals include optimal operating setpoints. Free cooling controller 1330 can operate as a low level optimizer (e.g., an instance of low level optimizer 1232) to determine optimal operating setpoints for water pumps 1404 and cooling tower fan 1328. The optimal operating setpoints can include, for example, optimal flowrate setpoints or speed setpoints for tower water pumps 1312, chilled water pumps 1314, and/or cooling tower fan 1328. The control signals provided by controller 1330 may cause water pumps 1404 and cooling tower fan 1328 to increase or decrease their throughput in order to optimally satisfy the cooling load $\dot{Q}_{load}$ with minimum power consumption.

Free cooling controller 1330 can be configured to perform a multi-stage optimization process to determine the optimal power consumption of free cooling system 1300. In the first stage of the optimization process, free cooling controller 1330 may determine the optimal flowrate $\dot{V}_{tower}$ for the water in cooling tower circuit 1316. The optimal flowrate $\dot{V}_{tower}$ may be defined as the flowrate that results in heat exchanger 1304 transferring heat from chilled water circuit 1318 to cooling tower circuit 1316 at a rate of $\dot{Q}_{HX} = \dot{Q}_{load}$. In the second stage of the optimization process, free cooling controller 1330 may determine the optimal airflow rate $\dot{V}_{air}$ in order to satisfy the energy balance equation $\dot{Q}_{HX} - \dot{Q}_{tower} = 0$. Once the optimal flowrates $\dot{V}_{tower}$ and $\dot{V}_{air}$ have been determined, free cooling controller 1330 may compute the sum of the pressure drops across the various components of free cooling system 1300. Free cooling controller 1330 can use the pressure drop information to calculate the power consumed by water pumps 1312, 1314 and cooling tower 1302. These and other features of free cooling controller 1330 are described in greater detail below.

Still referring to FIG. 14, controller 1330 is shown to include a communications interface 1406 and a processing circuit 1408. Communications interface 1406 can include wired or wireless interfaces (e.g., jacks, antennas, transmitters, receivers, transceivers, wire terminals, etc.) for conducting data communications with various systems, devices, or networks. For example, communications interface 1406 can include an Ethernet card and port for sending and receiving data via an Ethernet-based communications network and/or a WiFi transceiver for communicating via a wireless communications network. Communications interface 1406 can be configured to communicate via local area networks or wide area networks (e.g., the Internet, a building WAN, etc.) and may use a variety of communications protocols (e.g., BACnet, IP, LON, etc.).

Communications interface 1406 can be a network interface configured to facilitate electronic data communications between controller 1330 and various external systems or devices (e.g., sensors 1402, water pumps 1404, cooling tower fan 1328, high level optimizer 1230, etc.). For example, controller 1330 can receive measurements from sensors 1402 and the required cooling rate $\dot{Q}_{load}$ from high level optimizer 1230 via communications interface 1406. Controller 1330 can use the measurements to calculate values for the cooling tower water flowrate $\dot{V}_{tower}$, the cooling tower air flowrate $\dot{V}_{air}$, the pressure drops ΔP across water pumps 1404, and the power consumption of free cooling system 1300. Controller 1330 can use communications interface 1406 to send control signals to water pumps 1404 and cooling tower fan 1328. In some embodiments, controller 1330 uses communications interface 1406 to provide the estimated power consumption of free cooling system 1300 to high level optimizer 1230 for use the high level optimization algorithm.

Processing circuit 1408 is shown to include a processor 1410 and memory 1412. Processor 1410 can be a general purpose or specific purpose processor, an application specific integrated circuit (ASIC), one or more field programmable gate arrays (FPGAs), a group of processing components, or other suitable processing components. Processor 1410 can be configured to execute computer code or instructions stored in memory 1412 or received from other computer readable media (e.g., CDROM, network storage, a remote server, etc.).

Memory 1412 can include one or more devices (e.g., memory units, memory devices, storage devices, etc.) for storing data and/or computer code for completing and/or facilitating the various processes described in the present disclosure. Memory 1412 can include random access memory (RAM), read-only memory (ROM), hard drive storage, temporary storage, non-volatile memory, flash memory, optical memory, or any other suitable memory for storing software objects and/or computer instructions. Memory 1412 can include database components, object code components, script components, or any other type of information structure for supporting the various activities and information structures described in the present disclosure. Memory 1412 can be communicably connected to processor 1410 via processing circuit 1408 and can include computer code for executing (e.g., by processor 1410) one or more processes described herein.

Tower Water Flowrate Optimization

Still referring to FIG. 14, free cooling controller 1330 is shown to include a tower water flowrate optimizer 1414. Tower water flowrate optimizer 1414 can be configured to determine an optimal tower water flowrate $\dot{V}_{tower}$ through cooling tower circuit 1316 in order to remove the correct amount of heat $\dot{Q}_{HX}$ from chilled water circuit 1318 (e.g., $\dot{Q}_{HX}=\dot{Q}_{load}$). The optimization performed by tower water flowrate optimizer 1414 may be constrained by the second law of thermodynamics based on the temperature difference across hot size 1308 and cold side 1306 of heat exchanger 1304, the flowrates $\dot{V}_{tower}$ in cooling tower circuit 1316 and $\dot{V}_{building}$ in chilled water circuit 1318, the heat transfer surface area in heat exchanger 1304, and overall heat transfer coefficient of heat exchanger 1304. The values of all these variables and parameters may be known, with the exception of the flowrate $\dot{V}_{tower}$ in cooling tower circuit 1316.

In some embodiments, tower water flowrate optimizer 1414 performs the first stage of a multi-stage optimization process. In the first stage of the optimization process, tower water flowrate optimizer 1414 may determine the optimal value of tower water flowrate $\dot{V}_{tower}$ in order to ensure an energy balance in chilled water circuit 1318. Tower water flowrate optimizer 1414 can use any of a variety of optimization techniques to determine the optimal value of $\dot{V}_{tower}$.

Several examples of optimization techniques which can be used by tower water flowrate optimizer 1414 are described in detail below.

In some embodiments, tower water flowrate optimizer 1414 uses an iterative optimization technique (e.g., the NTU-ε method) to iteratively solve for $T_{tower}^{return}$ and the heat transfer rate $\dot{Q}_{HX}$ until the correct heat transfer rate is calculated. That is, until:

$$\dot{Q}_{HX} - \varepsilon \dot{Q}_{max} = 0$$

where $\dot{Q}_{max}$ is the maximum possible heat transfer rate in heat exchanger 1304 and ε is the heat transfer effectiveness. The maximum possible heat transfer rate $\dot{Q}_{max}$ can be calculated using the following equation:

$$\dot{Q}_{max} = \min(\rho \dot{V}_{tower} c_p^w, \rho \dot{V}_{building} c_p^w) \times (T_{building}^{return} - T_{tower}^{supply})$$

where ρ is the density of water $$\left(\text{e.g., } 997.05 \ \frac{\text{kg}}{\text{m}^3}\right)$$

and $c_p^w$ is the specific heat capacity of water $$\left(\text{e.g., } 4.190 \ \frac{\text{kJ}}{\text{kg} \cdot \text{K}}\right).$$

In some embodiments, both the heat transfer effectiveness ε and the maximum possible heat transfer $\dot{Q}_{max}$ are functions of the unknown tower water flowrate $\dot{V}_{tower}$. Tower water flowrate optimizer 1414 can use a nonlinear algebraic solver to find the root of the equation $\dot{Q}_{HX} - \varepsilon \dot{Q}_{max} = 0$. For example, the effectiveness ε can be defined as:

$$\varepsilon = \frac{1 - \exp[-NTU(1 - C_r)]}{1 - C_r \exp[-NTU(1 - C_r)]}$$

where $C_r$ is given by:

$$C_r = \frac{\min(\rho \dot{V}_{tower} c_p^w, \rho \dot{V}_{building} c_p^w)}{\max(\rho \dot{V}_{tower} c_p^w, \rho \dot{V}_{building} c_p^w)}$$

From this equation, it is clear that $C_r$ is a simple ratio (i.e., $0 < C_r < 1$) with both ρ and $c_p^w$ in the numerator and denominator. Accordingly, ρ and $c_p^w$ will cancel in the numerator and denominator and the ratio $C_r$ will be equal to:

$$C_r = \frac{\min(\dot{V}_{tower}, \dot{V}_{building})}{\max(\dot{V}_{tower}, \dot{V}_{building})}$$

In the limit as $C_r \to 0$, the effectiveness ε becomes:

$$\varepsilon = 1 - \exp(-NTU)$$

and in the limit as $C_r \to 1$, the effectiveness ε becomes:

$$\varepsilon = \frac{NTU}{1 + NTU}$$

where NTU is a dimensionless quantity representing the number of transfer units of heat exchanger 1304. Tower water flowrate optimizer 1414 can calculate NTU using the following equation:

$$NTU = \frac{UA}{\min(\rho \dot{V}_{tower} c_p^w, \rho \dot{V}_{building} c_p^w)}$$

where UA is the product of the overall heat transfer coefficient with the heat transfer surface area (kW/K) of heat exchanger 1304. In some embodiments, the value of UA can be obtained from design data or manufacturer specifications for heat exchanger 1304. For example, UA may have a value of $$UA = 1815.65 \, \frac{kW}{K}$$

in some embodiments.

In some embodiments, tower water flowrate optimizer 1414 uses successive substitution to determine the optimal value for $\dot{V}_{tower}$. For example, assuming that $\dot{V}_{tower} < \dot{V}_{building}$, the equation $\dot{Q}_{HX} - \varepsilon \dot{Q}_{max} = 0$ can be rewritten as follows:

$$\dot{V}_{tower} = \frac{\dot{Q}_{HX}}{\varepsilon(\dot{V}_{tower}) \times \rho c_p^w (T_{building}^{return} - T_{tower}^{supply})} = F(\dot{V}_{tower})$$

where the term $\varepsilon(\dot{V}_{tower})$ in the denominator indicates that the effectiveness $\varepsilon$ is a function of $\dot{V}_{tower}$. Tower water flowrate optimizer 1414 can recursively substitute values for $\dot{V}_{tower}$ into the previous equation until the equation is balanced within a given tolerance:

$$\dot{V}_{tower}^{k+1} = F(\dot{V}_{tower}^k)$$

Figure 16:
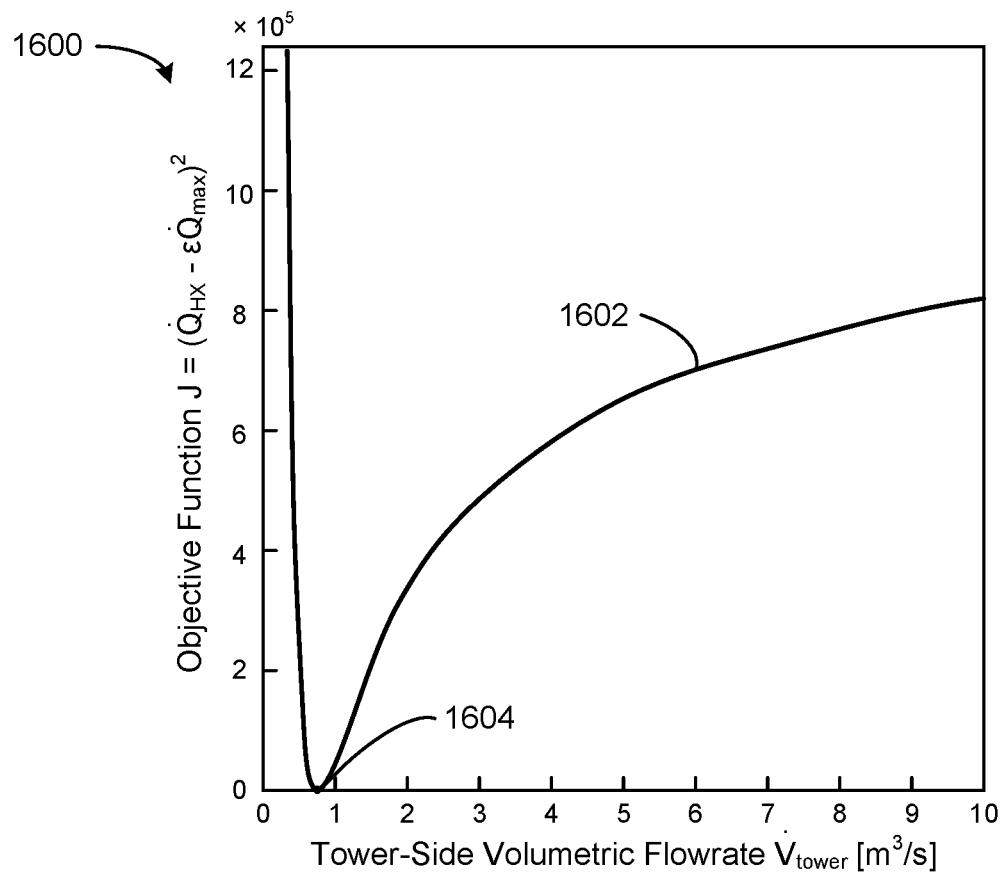
FIG. 16 is a graph of an objective function which can be optimized by the free cooling controller of FIG. 14 to determine an optimal water flowrate in the cooling tower circuit, according to an exemplary embodiment.

In some embodiments, tower water flowrate optimizer 1414 uses an optimization algorithm to identify the optimal flowrate $\dot{V}_{tower}$ by minimization of a least squares objective function J. The problem then becomes:

$$\min_{\dot{V}_{tower}} (\dot{Q}_{HX} - \varepsilon \dot{Q}_{max})^2 = 0$$

subject to the constraint $\dot{V}_{tower} \geq 0$. A plot 1600 of the objective function $J = (\dot{Q}_{HX} - \varepsilon \dot{Q}_{max})^2$ as a function of $\dot{V}_{tower}$ is shown in FIG. 16. In plot 1600, line 1602 represents the value of the objective function J. The objective function J is generally smooth with a well-defined global minimum 1604 that touches the x-axis precisely at the location of the root $$\left(e.g., \, at \, \dot{V}_{tower} \sim 0.726 \, \frac{m^3}{s}\right).$$

One advantage of this method of root finding is that tower water flowrate optimizer 1414 can still find the global minimum 1604 even if the objective function J never reaches a value of zero.

In some embodiments, tower water flowrate optimizer 1414 uses the regula falsi method (i.e., the method of false position) to find the optimal flowrate $\dot{V}_{tower}$. This method uses two points a and b such that f(a) differs in sign from f(b). In other words, f(a)×f(b)<0. By Bolzano's Theorem, since these two points differ in sign, there must be a root somewhere within the interval (a, b). This method repeatedly shortens the interval such that there is always a sign change across the two points (a, f(a)) and (b, f(b)) by finding the root of the line connecting (a, f(a)) and (b, f(b)). Since the regula falsi method requires a sign change in order to work, the function shown in plot 1600 would not work with the regula falsi method because there is no sign change around the root. However, an advantage of the regula falsi method is that if the function is well-behaved, then convergence to a root within the interval is guaranteed.

In some embodiments, tower water flowrate optimizer 1414 uses a secant method to find the optimal flowrate $\dot{V}_{tower}$. The secant method may be a modified version of the Newton-Rhapson method. In the Newton-Rhapson method, derivative information is required to use the recurrence relation. For example, the Newton-Raphson method for finding the root f(x)=0 of an algebraic expression is given by:

$$x_{k+1} = x_k - \frac{f(x_k)}{f'(x_k)}$$

The secant method is a finite-difference approximation of the Newton-Raphson method. In the secant method, the recurrence relation is:

$$x_{k+1} = x_k - \frac{f(x_k)}{\Delta f(x_k)}$$

$$\Delta f(x_k) = \frac{f(x_k) - f(x_{k-1})}{x_k - x_{k-1}}$$

Tower water flowrate optimizer 1414 can use any of the methods or techniques described above to determine the optimal flowrate $\dot{V}_{tower}$ in cooling tower circuit 1316. The optimal flowrate $\dot{V}_{tower}$ may be defined as the flowrate that satisfies the equation $\dot{Q}_{HX} - \varepsilon \dot{Q}_{max} = 0$ and/or the flowrate that minimizes the difference between $\dot{Q}_{HX}$ and $\varepsilon \dot{Q}_{max}$, where the effectiveness $\varepsilon$ of heat exchanger 1304 is a function of the flowrate $\dot{V}_{tower}$, as previously described. In this equation, the value of $\dot{Q}_{HX}$ represents the actual heat transfer across heat exchanger 1304. The value of $\dot{Q}_{HX}$ may be equal to the cooling load $\dot{Q}_{load}$ of building 1310, which may be provided as a known input to tower water flowrate optimizer 1414 (e.g., from high level optimizer 1230). The values of the heat exchanger effectiveness $\varepsilon$ and $\dot{Q}_{max}$ may be functions of the flowrate $\dot{V}_{tower}$ and can be optimized by tower water flowrate optimizer 1414 using any of the techniques previously described (e.g., the NTU-$\varepsilon$ method, the successive substitution method, least-squares optimization, the Newton-Raphson method, the secant method, etc.).

Tower Air Flowrate Optimization

Still referring to FIG. 14, free cooling controller 1330 is shown to include a tower air flowrate optimizer 1416. Tower air flowrate optimizer 1416 can be configured to determine the optimal flowrate $\dot{V}_{air}$ of the air through cooling tower 1302. By adjusting the air flowrate $\dot{V}_{air}$ (e.g., by operating cooling tower fan 1328), controller 1330 can adjust the rate of heat rejection $\dot{Q}_{tower}$ in cooling tower 1302. In some embodiments, the optimal air flowrate $\dot{V}_{air}$ is the flowrate that causes the rate of heat rejection $\dot{Q}_{tower}$ in cooling tower 1302 to equal the rate of heat absorption $\dot{Q}_{HX}$ in heat exchanger 1304. For example, the optimal air flowrate $\dot{V}_{air}$ may cause cooling tower 1302 to satisfy an energy balance for cooling tower circuit 1316 such that:

$$\dot{Q}_{HX} - \dot{Q}_{tower} = 0$$

In other embodiments, the optimal air flowrate $\dot{V}_{air}$ is the flowrate that minimizes the difference between $\dot{Q}_{HX}$ and $\dot{Q}_{tower}$.

In some embodiments, tower air flowrate optimizer 1416 performs the second stage of a multi-stage optimization process. Tower air flowrate optimizer 1416 can use any of the techniques previously described to determine the optimal air flowrate $\dot{V}_{air}$. For example, tower air flowrate optimizer 1416 can use the NTU-ε method, the successive substitution method, least-squares optimization, the Newton-Raphson method, and/or the secant method, as described with reference to tower water flowrate optimizer 1414. In some embodiments, tower air flowrate optimizer 1416 uses the secant method to find the root of the objective function $J = \dot{Q}_{HX} - \dot{Q}_{tower}$ (i.e., $\dot{Q}_{HX} - \dot{Q}_{tower} = 0$), where the heat transfer rate $\dot{Q}_{tower}$ is a function of the air flowrate $\dot{V}_{air}$.

Figure 15:
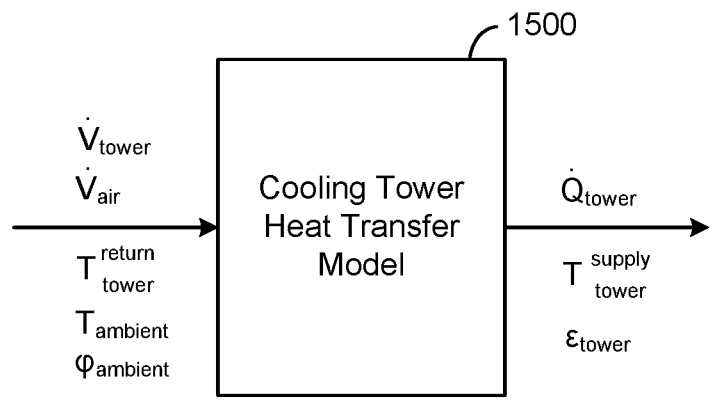
FIG. 15 is a block diagram is a cooling tower heat transfer model which can be used by the free cooling controller of FIG. 14 to determine an optimal air flowrate in the cooling tower, according to an exemplary embodiment.

In some embodiments, tower air flowrate optimizer 1416 uses a cooling tower heat transfer model 1500 to model the heat transfer $\dot{Q}_{tower}$ in cooling tower 1302. As shown in FIG. 15, cooling tower heat transfer model 1500 may define the heat transfer $\dot{Q}_{tower}$ in cooling tower 1302, the temperature $T_{tower}^{supply}$ of the water leaving cooling tower 1302, and the cooling tower effectiveness $\varepsilon_{tower}$ as a function of several inputs to model 1500. The inputs to model 1500 are shown to include the cooling tower water flowrate $\dot{V}_{tower}$, the cooling tower air flowrate $\dot{V}_{air}$, the temperature $T_{tower}^{return}$ of the water entering cooling tower 1302, the ambient dry bulb temperature $T_{ambient}$, and the ambient relative humidity $\varphi_{ambient}$. All of these inputs may have known and/or controlled values. For example, the cooling tower water flowrate $\dot{V}_{tower}$ can be set to the value previously determined by tower water flowrate optimizer 1414. The values of $T_{tower}^{return}$, $T_{ambient}$, and $\varphi_{ambient}$ can be measured by various sensors in free cooling system 1300. The value of $\dot{V}_{air}$ can be adjusted by free cooling controller 1330 to achieve the desired value for the heat transfer rate $\dot{Q}_{tower}$.

In some embodiments, the temperature $T_{tower}^{supply}$ of the water leaving cooling tower 1302 is an optimization variable and assumed to have a known or assigned value. However, tower air flowrate optimizer 1416 may also calculate the value of $T_{tower}^{supply}$ using cooling tower heat transfer model 1500. In some embodiments, tower air flowrate optimizer 1416 compares the calculated value for the temperature of the water leaving cooling tower 1302 (i.e., $T_{tower}^{supply,calc}$) to the value assigned to $T_{tower}^{supply}$ as an optimization variable to ensure that the two temperatures match. In other words, tower air flowrate optimizer 1416 may verify that:

$$T_{tower}^{supply,calc} - T_{tower}^{supply} = 0$$

where $T_{tower}^{supply,calc}$ is the value calculated by cooling tower heat transfer model 1500 and $T_{tower}^{supply}$ is the value assigned to the cooling tower water exit temperature as an optimization variable.

Pressure Drop and Power Consumption Estimation

Still referring to FIG. 14, free cooling controller 1330 is shown to include a pressure drop calculator 1418 and a power consumption estimator 1420. Pressure drop calculator 1418 can be configured to calculate the pressure drops across various HVAC devices in cooling tower circuit 1316. For example, pressure drop calculator 1418 can calculate the pressure drop $\Delta P_{pump}$ of the water in cooling tower circuit 1316 across tower water pumps 1312, the pressure drop $\Delta P_{tower}$ of the water in cooling tower circuit 1316 across cooling tower 1302, and/or the pressure drop $\Delta P_{HX}$ of the water in cooling tower circuit 1316 across heat exchanger 1304. In some embodiments, pressure drop calculator 1418 calculates the pressure drop $\Delta P_{fan}$ of the air passing through cooling tower 1302 across fan 1328.

The pressure drops calculated by pressure drop calculator 1418 may be a function of the cooling tower water flowrate $\dot{V}_{tower}$ and/or the cooling tower air flowrate $\dot{V}_{air}$. For example, pressure drop calculator 1418 can calculate the change in pressure $\Delta P_{pump}$ across tower water pumps 1312 necessary to cause the desired tower water flowrate $\dot{V}_{tower}$ through cooling tower circuit 1316. The relationship between $\dot{V}_{tower}$ and $\Delta P_{pump}$ can be defined by an equipment model for tower water pumps 1312 and/or a pressure model for cooling tower circuit 1316. In some embodiments, the pressure model is an empirical model based on a set of measured tower water flowrates $\dot{V}_{tower}$ and corresponding pressure changes $\Delta P_{pump}$ across tower water pumps 1312.

The pressure drop across a HVAC device can have a positive value if the change in pressure across the HVAC device is positive (i.e., a pressure gain) or a negative value if the change in pressure across the HVAC device is negative (i.e., a pressure drop). For example, tower water pumps 1312 may cause a pressure gain, whereas cooling tower 1302 and/or heat exchanger 1304 may cause a pressure drop. In some embodiments, the pressure gain $\Delta P_{pump}$ caused by tower water pumps 1312 is equal to the sum of the pressure drop $\Delta P_{tower}$ across cooling tower 1302 and the pressure drop $\Delta P_{tower}$ across heat exchanger 1304. In other words, the pressure changes of the water in cooling tower circuit 1316 across tower water pumps 1312, cooling tower 1302, and heat exchanger 1304 sum to zero (e.g., $\Delta P_{pump} + \Delta P_{tower} + \Delta P_{HX} = 0$).

Power consumption estimator 1420 can be configured to estimate the power consumption of the HVAC devices in free cooling system 1300. In some embodiments, power consumption estimator 1420 estimates the power consumption of the HVAC devices in cooling tower circuit 1316. For example, power consumption estimator 1420 may estimate the power consumption $W_{tower}$ of cooling tower 1302, the power consumption $W_{fan}$ of cooling tower fan 1328, and/or the power consumption $W_{pump}$ tower water pumps 1312. Heat exchanger 1304 may consume no electric power and can be excluded from the power consumption estimation.

In some embodiments, the power consumption values estimated by power consumption estimator 1420 are functions of the flow rates $\dot{V}_{tower}$ and $\dot{V}_{air}$ and/or the pressure drops $\Delta P_{pump}$ and $\Delta P_{fan}$. For example, power consumption estimator 1420 can estimate the power consumption $W_{tower}$ as a function of the water flowrate $\dot{V}_{tower}$ through cooling tower 1302. Power consumption estimator 1420 can estimate the power consumption $W_{fan}$ of cooling tower fan 1328 as a function of the air flowrate $\dot{V}_{air}$ caused by fan 1328 and/or the pressure drop $\Delta P_{fan}$ across fan 1328. Power consumption estimator 1420 can estimate the power consumption $W_{pump}$ of tower water pumps 1312 as a function of the water flowrate $\dot{V}_{tower}$ caused by tower water pumps 1312 and/or the pressure change $\Delta P_{pump}$ across tower water pumps 1312.

The relationships between power consumption and pressure drop and/or flowrate for the HVAC devices of free cooling system 1300 can be defined by equipment models for the HVAC devices and/or power consumption models for the HVAC devices. For example, an equipment model for tower water pumps 1312 may define the power consumption $W_{pump}$ of tower water pumps 1312 as a function of the pressure change $\Delta P_{pump}$ across tower water pumps 1312. Similarly, an equipment model for fan 1328 may define the power consumption $W_{fan}$ of cooling tower fan 1328 as a function of the air flowrate $\dot{V}_{air}$ caused by fan 1328. In some embodiments, the power consumption models and/or equipment models are empirical models based on a set of measured power consumption values and corresponding pressure changes or flowrates.

Power consumption estimator 1420 can estimate a total power consumption $W_{total}$ of the power-consuming devices in cooling tower circuit 1316. In some embodiments, these devices include cooling tower 1302 (e.g., cooling tower fan 1328) and tower water pumps 1312. In some embodiments, power consumption estimator 1420 calculates the total power consumption $W_{total}$ by summing the power consumption of cooling tower fan 1328 and tower water pumps 1312 (i.e., $W_{total}=W_{fan}+W_{pump}$). Power consumption estimator 1420 can provide the total power consumption $W_{total}$ as an output to high level optimizer 1230. From the perspective of high level optimizer 1230, free cooling controller 1330 provides the estimated power consumption value $W_{total}$ as a function of the cooling load $\dot{Q}_{load}$. This allows high level optimizer 1230 to optimize the allocation of thermal energy loads to various subplants and to determine whether free cooling is economically optimal relative to mechanical cooling, based on the cooling load $\dot{Q}_{load}$.

As shown in FIG. 14, controller 1330 can provide control signals to water pumps 1404 (e.g., tower water pumps 1312 and chilled water pumps 1314) and cooling tower fan 1328. Controller 1330 can generate control signals for tower water pumps 1312 which cause tower water pumps 1312 to achieve the calculated pressure change $\Delta P_{pump}$ and/or the optimal tower water flowrate $\dot{V}_{tower}$. Similarly, controller 1330 can generate control signals for cooling tower fan 1328 which cause cooling tower fan 1328 to achieve the optimal tower air flowrate $\dot{V}_{air}$. In this way, controller 1330 can operate the HVAC devices of free cooling system 1300 to achieve the optimal values determined by tower water flowrate optimizer 1414, tower air flowrate optimizer 1416, and/or pressure drop calculator 1418.

Free Cooling Optimization Process

Figure 17:
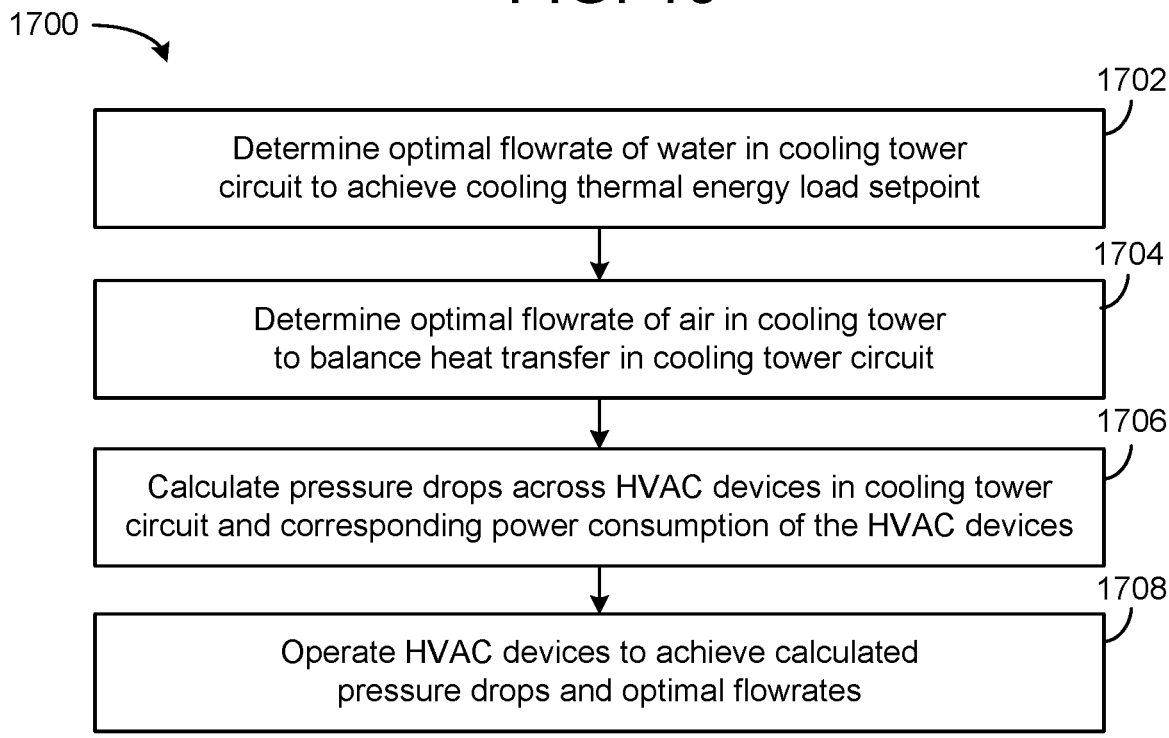
FIG. 17 is a flowchart of a process for optimizing the performance of a free cooling system, according to an exemplary embodiment.

Referring now to FIG. 17, a flowchart of a process 1700 for optimizing the performance of free cooling system 1300 is shown, according to an exemplary embodiment. Process 1700 can be used to determine optimal values for $\dot{V}_{tower}$ and $\dot{V}_{air}$, calculate the pressure drops across various HVAC devices in free cooling system 1300, and estimate the total power consumption of free cooling system 1300. Process 1700 can be performed by one or more components of free cooling system 1300 including, for example, free cooling controller 1330, cooling tower 1302, tower water pumps 1312, and cooling tower fan 1328.

Process 1700 is shown to include determining an optimal flowrate of water in a cooling tower circuit to achieve a cooling thermal energy load setpoint (step 1702). In some embodiments, step 1702 is performed by tower water flowrate optimizer 1414, as described with reference to FIG. 14. The optimal flowrate calculated in step 1702 may be the optimal flowrate $\dot{V}_{tower}$ of the water in cooling tower circuit 1316. The cooling thermal energy load setpoint may be the cooling load $\dot{Q}_{load}$ of building 1310 and/or the heat transfer rate $\dot{Q}_{HX}$ across heat exchanger 1304. In some embodiments, the optimal flowrate $\dot{V}_{tower}$ of the water in cooling tower circuit 1316 is the flowrate that removes heat from chilled water circuit 1318 at a rate of $\dot{Q}_{HX}$.

Step 1702 can include using any of the methods or techniques described above to determine the optimal flowrate $\dot{V}_{tower}$ in cooling tower circuit 1316. These methods include, for example, the NTU-ε method, the successive substitution method, least-squares optimization, the Newton-Raphson method, the secant method, etc. In some embodiments, the optimal flowrate $\dot{V}_{tower}$ is defined as the flowrate that satisfies the equation $\dot{Q}_{HX}-\epsilon\dot{Q}_{max}=0$ and/or the flowrate that minimizes the difference between $\dot{Q}_{HX}$ and $\epsilon\dot{Q}_{max}$, where the effectiveness ε of heat exchanger 1304 is a function of the flowrate $\dot{V}_{tower}$. In this equation, the value of $\dot{Q}_{HX}$ represents the actual heat transfer across heat exchanger 1304. The value of $\dot{Q}_{HX}$ may be equal to the cooling load $\dot{Q}_{load}$ of building 1310, which may be provided as a known input to tower water flowrate optimizer 1414 (e.g., from high level optimizer 1230). The values of the heat exchanger effectiveness ε and $\dot{Q}_{max}$ may be functions of the flowrate $\dot{V}_{tower}$ and can be adjusted by increasing or decreasing the flowrate $\dot{V}_{tower}$.

Still referring to FIG. 17, process 1700 is shown to include determining an optimal flowrate of air in a cooling tower to balance heat transfer in the cooling tower circuit (step 1704). In some embodiments, step 1704 is performed by tower air flowrate optimizer 1416, as described with reference to FIG. 14. The optimal air flowrate calculated in step 1704 may be the optimal flowrate $\dot{V}_{air}$ of the air in cooling tower 1302. In some embodiments, the optimal air flowrate $\dot{V}_{air}$ is the flowrate that causes the rate of heat rejection $\dot{Q}_{tower}$ in cooling tower 1302 to equal the rate of heat absorption $\dot{Q}_{HX}$ in heat exchanger 1304. For example, the optimal air flowrate $\dot{V}_{air}$ may cause cooling tower 1302 to satisfy an energy balance for cooling tower circuit 1316 such that:

$$\dot{Q}_{HX}-\dot{Q}_{tower}=0$$

In other embodiments, the optimal air flowrate $\dot{V}_{air}$ is the flowrate that minimizes the difference between $\dot{Q}_{HX}$ and $\dot{Q}_{tower}$.

Step 1704 can include using any of the techniques previously described to determine the optimal air flowrate $\dot{V}_{air}$. For example, step 1704 can include using the NTU-ε method, the successive substitution method, least-squares optimization, the Newton-Raphson method, and/or the secant method, as described with reference to FIG. 14. In some embodiments, step 1704 includes using the secant method to find the root of the objective function $J=\dot{Q}_{HX}-\dot{Q}_{tower}$ (i.e., $\dot{Q}_{HX}-\dot{Q}_{tower}=0$), where the heat transfer rate $\dot{Q}_{tower}$ is a function of the air flowrate $\dot{V}_{air}$.

In some embodiments, step 1704 includes using cooling tower heat transfer model 1500 to model the heat transfer $\dot{Q}_{tower}$ in cooling tower 1302. Cooling tower heat transfer model 1500 may define the heat transfer $\dot{Q}_{tower}$ in cooling tower 1302, the temperature $T_{tower}^{supply}$ of the water leaving cooling tower 1302, and the cooling tower effectiveness $\epsilon_{tower}$ as a function of several inputs to model 1500. The inputs to model 1500 may include, for example, the cooling tower water flowrate $\dot{V}_{tower}$, the cooling tower air flowrate $\dot{V}_{air}$, the temperature $T_{tower}^{return}$ of the water entering cooling tower 1302, the ambient dry bulb temperature $T_{ambient}$, and the ambient relative humidity $\varphi_{ambient}$. All of these inputs may have known and/or controlled values. For example, the cooling tower water flowrate $\dot{V}_{tower}$ can be set to the value previously determined in step 1702. The values of $T_{tower}^{return}$, $T_{ambient}$, and $\varphi_{ambient}$ can be measured by various sensors in free cooling system 1300. The value of $\dot{V}_{air}$ can be adjusted by free cooling controller 1330.

Still referring to FIG. 17, process 1700 is shown to include calculating pressure drops across HVAC devices in the cooling tower circuit and corresponding power consumption of the HVAC devices (step 1706). In some embodiments, step 1706 is performed by pressure drop calculator 1418 and power consumption estimator 1420, as described with reference to FIG. 14. Step 1706 can include calculating the pressure drops $\Delta P_{pump}$ of the water in cooling tower circuit 1316 across tower water pumps 1312, the pressure drop $\Delta P_{tower}$ of the water in cooling tower circuit 1316 across cooling tower 1302, and/or the pressure drop $\Delta P_{HX}$ of the water in cooling tower circuit 1316 across heat exchanger 1304. In some embodiments, step 1706 includes calculating the pressure drop $\Delta P_{fan}$ of the air passing through cooling tower 1302 across fan 1328.

The pressure drops calculated in step 1706 may be a function of the cooling tower water flowrate $\dot{V}_{tower}$ and/or the cooling tower air flowrate $\dot{V}_{air}$. For example, step 1706 can include calculating the change in pressure $\Delta P_{pump}$ across tower water pumps 1312 necessary to cause the desired tower water flowrate $\dot{V}_{tower}$ through cooling tower circuit 1316. The relationship between $\dot{V}_{tower}$ and $\Delta P_{pump}$ can be defined by an equipment model for tower water pumps 1312 and/or a pressure model for cooling tower circuit 1316. In some embodiments, the pressure model is an empirical model based on a set of measured tower water flowrates $\dot{V}_{tower}$ and corresponding pressure changes $\Delta P_{pump}$ across tower water pumps 1312.

Step 1706 can include estimating the power consumption $W_{tower}$ of cooling tower 1302, the power consumption $W_{fan}$ of cooling tower fan 1328, and/or the power consumption $W_{pump}$ tower water pumps 1312. Heat exchanger 1304 may consume no electric power and can be excluded from the power consumption estimation. In some embodiments, the power consumption values estimated in step 1706 are functions of the flow rates $\dot{V}_{tower}$ and $\dot{V}_{air}$ and/or the pressure drops $\Delta P_{pump}$ and $\Delta P_{fan}$. For example, step 1706 can include estimating the power consumption $W_{tower}$ as a function of the water flowrate $\dot{V}_{tower}$ through cooling tower 1302. Step 1706 can include estimating the power consumption $W_{fan}$ of cooling tower fan 1328 as a function of the air flowrate $\dot{V}_{air}$ caused by fan 1328 and/or the pressure drop $\Delta P_{fan}$ across fan 1328. Step 1706 can include estimating the power consumption $W_{pump}$ of tower water pumps 1312 as a function of the water flowrate $\dot{V}_{tower}$ caused by tower water pumps 1312 and/or the pressure change $\Delta P_{pump}$ across tower water pumps 1312.

The relationships between power consumption and pressure drop and/or flowrate for the HVAC devices of free cooling system 1300 can be defined by equipment models for the HVAC devices and/or power consumption models for the HVAC devices. For example, an equipment model for tower water pumps 1312 may define the power consumption $W_{pump}$ of tower water pumps 1312 as a function of the pressure change $\Delta P_{pump}$ across tower water pumps 1312. Similarly, an equipment model for fan 1328 may define the power consumption $W_{fan}$ of cooling tower fan 1328 as a function of the air flowrate $\dot{V}_{air}$ caused by fan 1328. In some embodiments, the power consumption models and/or equipment models are empirical models based on a set of measured power consumption values and corresponding pressure changes or flowrates.

In some embodiments, step 1706 includes estimating a total power consumption $W_{total}$ of the power-consuming devices in cooling tower circuit 1316. These devices may include cooling tower 1302 (e.g., cooling tower fan 1328) and tower water pumps 1312. In some embodiments, step 1706 includes calculating the total power consumption $W_{total}$ by summing the power consumption of cooling tower fan 1328 and tower water pumps 1312 (i.e., $W_{total}=W_{fan}+W_{pump}$). Step 1706 can include providing the total power consumption $W_{total}$ as an output to high level optimizer 1230. This allows high level optimizer 1230 to optimize the allocation of thermal energy loads to various subplants and to determine whether free cooling is economically optimal relative to mechanical cooling, based on the cooling load $\dot{Q}_{load}$.

Still referring to FIG. 17, process 1700 is shown to include operating HVAC devices to achieve the calculated pressure drops and optimal flowrates (step 1708). Step 1708 can be performed by free cooling controller 1330 by providing control signals to various components of free cooling system 1300. For example, controller 1330 can provide control signals to water pumps 1404 (e.g., tower water pumps 1312 and chilled water pumps 1314) and cooling tower fan 1328. Step 1708 can include generating control signals for tower water pumps 1312 which cause tower water pumps 1312 to achieve the calculated pressure change $\Delta P_{pump}$ and/or the optimal tower water flowrate $\dot{V}_{tower}$. Similarly, step 1708 can include generating control signals for cooling tower fan 1328 which cause cooling tower fan 1328 to achieve the optimal tower air flowrate $\dot{V}_{air}$. In this way, the HVAC devices of free cooling system 1300 can be operated in step 1708 to achieve the optimal flowrates and pressure drops determined in steps 1702-1706.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A heating, ventilation, or air conditioning (HVAC) system for a building, the HVAC system comprising:
   a heat exchanger configured to transfer heat from a chilled fluid circuit to a cooling tower circuit at a first rate of heat transfer dependent upon a flowrate of a coolant in the cooling tower circuit to provide cooling for a chilled fluid in the chilled fluid circuit;
   a cooling tower configured to remove heat from the cooling tower circuit at a second rate of heat transfer dependent upon a flowrate of air through the cooling tower to provide cooling for the coolant in the cooling tower circuit;
   one or more pumps configured to circulate the coolant between the cooling tower and the heat exchanger via the cooling tower circuit; and
   a free cooling controller configured to:
      determine an optimal flowrate of the coolant in the cooling tower circuit by minimizing a difference between the first rate of heat transfer in the heat exchanger and a cooling load setpoint;
      determine an optimal flowrate of the air through the cooling tower by minimizing a difference between the second rate of heat transfer in the cooling tower and the first rate of heat transfer in the heat exchanger; and
      operate the one or more pumps and the cooling tower to achieve the optimal flowrate of the coolant in the cooling tower circuit and the optimal flowrate of the air through the cooling tower.

2. The HVAC system of claim 1, wherein the free cooling controller is configured to:
   estimate a power consumption of the one or more pumps required to achieve the optimal flowrate of the coolant in the cooling tower circuit;
   estimate a power consumption of the cooling tower required to achieve the optimal flowrate of air through the cooling tower; and
   estimate a total power consumption based on the power consumption of the one or more pumps and the power consumption of the cooling tower.

3. The HVAC system of claim 1, further comprising an optimizer configured to provide the cooling load setpoint to the free cooling controller; wherein the free cooling controller is configured to:
   estimate a minimum power consumption required to achieve the cooling load setpoint based on the optimal flowrate of the coolant in the cooling tower circuit and the optimal flowrate of air through the cooling tower; and
   provide the estimated minimum power consumption to the optimizer.

4. The HVAC system of claim 1, wherein the free cooling controller is configured to determine the optimal flowrate of the coolant in the cooling tower circuit using an iterative numerical technique comprising at least one of successive substitution, a Newton-Raphson method, and a secant method.

5. The HVAC system of claim 1, wherein the free cooling controller is configured to determine the optimal flowrate of the coolant in the cooling tower circuit by iteratively adjusting the flowrate of the coolant in the cooling tower circuit until the first rate of heat transfer in the heat exchanger equals a rate at which the chilled fluid circuit absorbs heat from the building.

6. The HVAC system of claim 1, wherein the free cooling controller is configured to determine the optimal flowrate of the air through the cooling tower by iteratively adjusting the flowrate of the air through the cooling tower until the second rate of heat transfer in the cooling tower equals the first rate of heat transfer in the heat exchanger.

7. The HVAC system of claim 1, wherein the free cooling controller is configured to determine the optimal flowrate of the coolant in the cooling tower circuit by:
   recursively substituting values for the flowrate of the coolant in the cooling tower circuit into a first equation that defines an effectiveness of the heat exchanger as a function of the flowrate of the coolant in the cooling tower circuit, evaluating the first equation to determine resulting values of the effectiveness, and substituting the resulting values of the effectiveness into a second equation that defines the flowrate of the coolant in the cooling tower circuit as a function of the effectiveness of the heat exchanger until the second equation is balanced.

8. The HVAC system of claim 1, comprising a chiller coupled to the chilled fluid circuit and the cooling tower circuit and configured to transfer the heat from the chilled fluid circuit to the cooling tower circuit when the HVAC system operates in a mechanical cooling mode, wherein the heat exchanger comprises one or more components of the chiller.

9. The HVAC system of claim 1, wherein the heat exchanger is configured to transfer the heat from the chilled fluid circuit to the cooling tower circuit when the HVAC system operates in a free cooling mode.

10. A method for providing free cooling to a building, the method comprising:
   using one or more pumps to circulate a coolant between a heat exchanger and a cooling tower via a cooling tower circuit, wherein the coolant absorbs heat in the heat exchanger at a first rate of heat transfer dependent upon a flowrate of the coolant in the cooling tower circuit and rejects heat in the cooling tower at a second rate of heat transfer dependent upon a flowrate of air through the cooling tower;
   determining an optimal flowrate of the coolant in the cooling tower circuit to achieve a cooling load setpoint by repeatedly adjusting the flowrate of the coolant to newly calculated values to reduce a difference between the first rate of heat transfer in the heat exchanger and the cooling load setpoint;

determining an optimal flowrate of air through the cooling tower to balance heat transfer in the cooling tower circuit by repeatedly adjusting the flowrate of the air to newly calculated values to reduce a difference between the second rate of heat transfer in the cooling tower and the first rate of heat transfer in the heat exchanger; and operating the one or more pumps and the cooling tower to achieve the optimal flowrate of the coolant in the cooling tower circuit and the optimal flowrate of the air through the cooling tower.

11. The method of claim 10, wherein:
the difference is reduced by updating or adjusting a model of the flowrate and re-calculating the difference.

12. The method of claim 10, further comprising:
estimating a power consumption of the one or more pumps required to achieve the optimal flowrate of the coolant in the cooling tower circuit;
estimating a power consumption of the cooling tower required to achieve the optimal flowrate of air through the cooling tower; and
estimating a total power consumption based on the power consumption of the one or more pumps and the power consumption of the cooling tower.

13. The method of claim 10, further comprising:
receiving the cooling load setpoint from an optimizer;
estimating a minimum power consumption required to achieve the cooling load setpoint based on the optimal flowrate of the coolant in the cooling tower circuit and the optimal flowrate of air through the cooling tower; and
providing the estimated minimum power consumption to the optimizer.

14. The method of claim 10, wherein determining the optimal flowrate of the coolant in the cooling tower circuit comprises using an iterative numerical technique comprising at least one of successive substitution, a Newton-Raphson method, and a secant method.

15. The method of claim 10, wherein determining the optimal flowrate of the coolant in the cooling tower circuit comprises iteratively adjusting the flowrate of the coolant in the cooling tower circuit until the first rate of heat transfer in the heat exchanger equals the cooling load setpoint for the building.

16. The method of claim 10, wherein determining the optimal flowrate of the air through the cooling tower comprises iteratively adjusting the flowrate of the air through the cooling tower until the second rate of heat transfer in the cooling tower equals the first rate of heat transfer in the heat exchanger.

17. The method of claim 10, wherein the heat exchanger comprises one or more components of a chiller coupled to a chilled fluid circuit and the cooling tower circuit and configured to transfer the heat from the chilled fluid circuit to the cooling tower circuit when the HVAC systems operates in a mechanical cooling mode.

18. A heating, ventilation, or air conditioning (HVAC) system for a building, the HVAC system comprising:
a cooling tower configured to remove heat from a coolant in a cooling tower circuit at a rate of heat transfer dependent upon a flowrate of air through the cooling tower;
one or more pumps configured to circulate the coolant between the cooling tower and a cooling load via the cooling tower circuit, wherein the cooling tower circuit is configured to absorb heat from the cooling load at a rate dependent upon the flowrate of the coolant in the cooling tower circuit; and
a free cooling controller configured to:
determine an optimal flowrate of the coolant in the cooling tower circuit by minimizing a difference between the rate at which the cooling tower circuit absorbs heat from the cooling load and a cooling load setpoint;
determine an optimal flowrate of the air through the cooling tower by reducing a difference between the rate of heat transfer in the cooling tower and the rate at which the cooling tower circuit absorbs heat from the cooling load; and
operate the one or more pumps and the cooling tower to achieve the optimal flowrate of the coolant in the cooling tower circuit and the optimal flowrate of the air through the cooling tower.

19. The HVAC system of claim 18, comprising a chiller coupled to a chilled fluid circuit and the cooling tower circuit and configured to transfer heat from the chilled fluid circuit to the cooling tower circuit when the HVAC system operates in a mechanical cooling mode, wherein the cooling load comprises one or more components of the chiller.

20. The HVAC system of claim 18, comprising a heat exchanger coupled to a chilled fluid circuit and the cooling tower circuit and configured to transfer heat from the chilled fluid circuit to the cooling tower circuit when the HVAC system operates in a free cooling mode, wherein the cooling load comprises the heat exchanger.

* * * * *